US012417296B2

(12) United States Patent
Townsend

(10) Patent No.: US 12,417,296 B2
(45) Date of Patent: Sep. 16, 2025

(54) METHODS AND SYSTEMS FOR TEAM COLLABORATION AND DOCUMENT MANAGEMENT

(71) Applicant: Patrick A. Townsend, Olympia, WA (US)

(72) Inventor: Patrick A. Townsend, Olympia, WA (US)

( * ) Notice: Subject to any disclaimer, the term of this patent is extended or adjusted under 35 U.S.C. 154(b) by 282 days.

(21) Appl. No.: 18/079,833

(22) Filed: Dec. 12, 2022

(65) Prior Publication Data

US 2024/0193282 A1 Jun. 13, 2024

(51) Int. Cl.
*G06F 16/182* (2019.01)
*G06F 21/60* (2013.01)

(52) U.S. Cl.
CPC .......... *G06F 21/602* (2013.01); *G06F 16/182* (2019.01)

(58) Field of Classification Search
None
See application file for complete search history.

(56) References Cited

U.S. PATENT DOCUMENTS

| | | | | |
|---|---|---|---|---|
| 2002/0129047 | A1* | 9/2002 | Cane | G06F 11/1464 |
| 2015/0244710 | A1* | 8/2015 | Koster | H04L 9/083 713/171 |
| 2017/0132200 | A1* | 5/2017 | Noland | G06F 40/186 |
| 2018/0293636 | A1* | 10/2018 | Pollak | G06Q 30/0625 |
| 2020/0044994 | A1* | 2/2020 | Milyakov | H04L 51/04 |
| 2020/0184097 | A1* | 6/2020 | T | H04L 9/3236 |
| 2020/0380050 | A1 | 12/2020 | Wang | |
| 2021/0281421 | A1* | 9/2021 | Semenovskiy | G06Q 20/3276 |
| 2023/0108610 | A1* | 4/2023 | Tang | G06Q 20/3672 705/66 |

(Continued)

FOREIGN PATENT DOCUMENTS

CN 112261112 1/2021

OTHER PUBLICATIONS

He, Wei et al., "Data Distribution Scheme for Information Service Based on Blockchain," 2022 2nd International Conference on Consumer Electronics and Computer Engineering (ICCECE), Jan. 14, 2022, pp. 21-25, XP034089151, DOI: 10.1109/ICCECE54139. 2022.9712811, retrieved from the Internet on Aug. 6, 2024, through IEEE, 5 pages.

(Continued)

*Primary Examiner* — Joshua Joo
(74) *Attorney, Agent, or Firm* — Lowe Graham Jones PLLC

(57) ABSTRACT

A user and business collaboration and document management solution is described. The solution utilizes the InterPlanetary File System (IPFS) or similar distributed and decentralized storage methods, in addition to the Publish/Subscribe (PubSub) message protocol or similar distributed messaging methods. As a fully decentralized and distributed solution, information is shared through cryptographically secure and resilient Web 3.0 mechanisms. The solution provides a number of secure collaboration services. Users can securely add, update, delete, archive and share documents on the IPFS file system. Local directory synchronization automates this task. A localized encryption key and secrets vault is used to protect data encryption keys, authentication credentials, and related secrets.

22 Claims, 26 Drawing Sheets

(56) References Cited

U.S. PATENT DOCUMENTS

2023/0115998 A1\* 4/2023 Multerer ............... G06F 16/955
                                                        707/709
2023/0129705 A1\* 4/2023 Wiklof ................ G06F 21/6245
                                                        726/26

OTHER PUBLICATIONS

Agostinho, Pedro, et al. "SmartPubSub: Content-based Pub-Sub on IPFS," Cornell University Library, Ithaca, New York, Jul. 13, 2022, 8 pages, arXiv.org, arXiv:2207.06369v1, XP091270931.
International Search Report and Written Opinion of the International Searching Authority dated Jun. 17, 2024, in International Patent Application No. PCT/US2023/083692, 25 pages.

\* cited by examiner

Overview

Data Stores**

Adding a Document

Updating a Document

Deleting Documents

Reading a Document

Search for Documents

Sharing Documents

Managing Documents

Backing Up Documents

Restore Documents

Send a User Message

User Chat

Video

Video Scheduling

Enroll Remote User

User Groups

Backup Service

Manage directory synchronization

Directory synchronization process

Alerts and Notifications
Process

Process PubSub Messages

Securing a PubSub Message

Decrypting a PubSub Message

METHODS AND SYSTEMS FOR TEAM COLLABORATION AND DOCUMENT MANAGEMENT

FIELD OF THE INVENTION

This invention relates to the collaboration of two or more individuals involving the management and sharing of documents, exchanging messages, chats, and video sessions, and other common collaboration activities. The invention is built upon the InterPlanetary File System (IPFS) (or similar decentralized and distributed storage systems) and related PubSub messaging facility (or similar decentralized and distributed message systems) to provide a decentralized and distributed collaboration system.

BACKGROUND

Distributed and decentralized file systems provide many advantages including redundancy, scalability, and fault tolerance. The InterPlanetary File System (IPFS) is one example of a distributed and decentralized file system. IPFS provides a single, global file system with unique content addressing. In IPFS, a community of distributed hosts (also referred to as "nodes") each store a portion of the universe of content. A distributed hash table is used to track the location or locations of content items.

IPFS and similar file systems lack security-related features. For example, IPFS does not provide any mechanism to represent users, groups, and file permissions. Nor does IPFS provide any standard mechanism for encrypting files while they are at rest. The present invention seeks to address these and other shortcomings.

SUMMARY

System Overview

The invention provides a user interface and application system for managing documents and collaboration tasks among users. The invention leverages the decentralized and distributed architecture of the open source IPFS (or similar) file system and related integrated technologies such as PubSub (or similar) messaging. Upon installing and starting the invention, the user is presented with a menu of options that includes managing and backing up documents, sending messages to other users, chatting electronically with other users, sharing documents, synchronizing local folders with IPFS, initiating video conferences, and other tasks conducive to personal work and team collaboration.

In addition to a user interface the invention also implements an application program interface and command line facility. The invention ensures that all activities performed are protected with encryption for confidentiality, content integrity, and cryptographic authentication. In one embodiment of the invention the distribution, configuration, and audit log collection of each user node is controlled and managed by a designated administrative node. Artificial intelligence and machine learning are used to assist in various collaborative functions.

Document Management

The invention provides for multiple actions related to managing documents including adding a new document to IPFS, reading a document, updating a document, adding a new version of a document, deleting a document, sharing a document, restoring a document, and so forth. Document management can be accomplished through a GUI application or through a Command Line Interface (CLI) which enables program control of document management. Users are able to view document attributes (name, create date, update date, hashtags, memo text, etc.), take actions on documents such as sharing with users and groups, sending the document to a backup service, and viewing document history. All documents stored on the IPFS file system are encrypted and the unique encryption key for the document is stored in a secure vault controlled by the document owner. Encryption keys are never shared with another user by default. In some implementations the encryption keys can be shared with another user or group.

A Document Backup Service

The invention also provides an integrated backup service to ensure that documents are never lost. The backup service stores a permanent copy of the original encrypted documents on a separate IPFS backup server or multiple servers, maintains a list of documents on the backup servers, and restores the documents to the user upon request. The backup server uses the decentralized and distributed IPFS and PubSub technologies for document transfer and application coordination. Each backup server may include multiple, redundant physical servers to ensure against hardware and network failures. The backup services may be deployed on cloud platforms, or be hosted by a third party hosting provider or other cloud or hosting facility, or deployed on private servers. All files stored on the backup servers are encrypted before transfer and storage. The backup service does not have access to the encryption keys for documents. Document backup may be automatic or manually initiated depending on the user configuration. In one embodiment of the invention the FileCoin storage service, or other commercial or open source storage system, is used for document backup.

Document Sharing

The invention also implements a distributed and decentralized secure document sharing system. A user can share any file that they own, but not documents they received from a remote user. In some implementations the remote user may grant the recipient the ability to share a document with others. Documents are encrypted with a unique encryption key that is stored in a local encryption key vault and the document is written to the IPFS system. A message is sent to the sharing recipient using the secure PubSub protocol with the identifier of the document. The recipient's local node receives the message and makes a document retrieval request to IPFS. When the document is received it is pinned to the recipient's node to make it permanent and it remains encrypted with the sender's encryption key. When the recipient attempts to read the file a request is made for the owner's encryption key using the PubSub protocol, the owner ensures that the recipient is authorized to receive the key, the key is securely sent to the recipient's node, the file is decrypted, and then read by the recipient. This process is repeated each time the document is read by the recipient. The encryption key is never stored on the recipient's node, unless authorized by the owner. Document sharing can be done for a single recipient, or to a group of recipients. For a group of recipients, the encrypted document is pulled to the local node of each recipient. Document sharing can be ended or suspended by the owner by restricting access to the encryption key. A full audit trail of file sharing activity is maintained on the sender's and receiver's node. The audit file includes the date and time of the document share, the date and time of the receipt of the document on the receiver's node, and a record of every request to read the file.

Document Search

The invention includes a document search function that includes the ability to search by document name or partial name, hashtag, memo text, create date or date range, last update date or date range, document version, keywords, document importance, document owner, document content values, and combinations of these attributes as well as other attributes. The search capability includes predictive search suggestions and supports partial values. Searches can be saved under a user-specified name and executed again at a later time. In some implementations artificial intelligence and machine learning are used to assist in the search function.

Messaging

The invention additionally implements a secure messaging facility using PubSub that ensures delivery of messages to other users and the backup service. This secure messaging facility incorporates the use of the open source PubSub or similar protocol. This invention ensures message confidentiality through encryption, message integrity through key based secure hashing, and mutual authentication of senders and receivers through cryptographic signatures. Automated processes can send and receive messages and process them for application functions or for delivery to end users. Failed or delayed delivery of messages is reported to the sender of a message so that the sender can take appropriate follow-up actions. This messaging facility is designed to support automated integration with a variety of third party applications that include Enterprise Resource Planning (ERP), Customer Relationship Management (CRM), and other personal and business applications.

A Chat System

The invention enables secure real-time chat sessions between users and groups using the PubSub messaging facility for message delivery across the decentralized and distributed network. All messages are encrypted, integrity protected, and authenticated using the credentials of the sender and receiver. This chat system also provides interfaces to the document management facility and the video facility for additional features.

Video Sessions

The invention includes the ability to initiate on-demand or scheduled video sessions to one or more users and groups through links to third party video applications. The PubSub messaging facility is used to deliver secure video session invitations and connection information. Video invitations and video informational messages are encrypted with keys stored in the secure vault. Multiple open source video solutions such as Jitsi may be used, as well as common commercial video conferencing solutions. This invention does not incorporate the functionality of video solutions, but does embody a method of securely coordinating video sessions via the decentralized and distributed PubSub message system, and the secure storage of recorded video sessions on the IPFS file system.

Encryption Key and Secrets Vault

The invention incorporates a secure vault for encryption keys, credentials and other secrets. Each document and message is encrypted with a unique key stored in this vault, and further protected for integrity and authentication. The encryption keys and similar secrets are never shared with external users and remain under the control of the local node user. Unique user-specific public and private keys are stored in the vault and used for digital signature generation for authentication and for message protection. All encryption keys, secrets, local user credentials, and remote user and node identifiers are stored in the secure vault.

Directory Integration

The invention includes the ability to synchronize one or more directories (folders) containing documents on a local computer system with the document management system. Documents that are added to designated directories will be automatically encrypted, saved to the IPFS file system, made permanent, and backed up to the remote backup service. The folder may also be associated with hashtags and descriptive text that is assigned by the user. One or more users and groups may be designated for a folder. When a user or group is defined for the folder the document will automatically be shared with each user and member of the group.

Application Program Interfaces

The invention includes a number of Application Program Interfaces (APIs) implemented via a command line facility. These APIs provide all of the major functions of document management and storage, messaging, chat, backup and recovery of documents, video scheduling and document sharing. The CLI is designed to be used by developers to integrate and extend the capability of the invention in their own environments, and to support system and user automation of many of the invention's capabilities.

Integrations

The invention supports the integration of elements of the collaboration features with third party applications through defined interfaces including the CLI previously described. For example, the invention will integrate with Microsoft Teams, SalesForce Slack, SalesForce CRM, email, mobile texting, and other user and collaboration applications. Using the CLI facility, users may create their own integrations to extend the capabilities of this invention.

Securing PubSub Messages

The invention implements a method of securing PubSub messages prior to sending via the PubSub messaging facility. Messages are protected for confidentiality, integrity and authentication using cryptographic methods. Strong encryption keys, keyed secure hash methods, and digital signatures are used to achieve message security. Messages are then protected from eavesdropping, substitution or impersonation through this method. Approved cryptographic methods are used to accomplish this message security. Some implementations use Quantum Resistant cryptographic methods.

Alerts and Notifications

The invention supports a variety of alerts and notifications which include, but are not limited to, receipt of new documents from remote users, arrival of new messages, the failure to deliver a shared document, the denial of document access by a remote user, the general failure of document and message operations, backup failures, and so forth. Alerts and notifications can be delivered through the solution's GUI interface, through forwarding to email and text messages, through integrations with third party applications, and by other means. Alerts and notifications are enabled through user configuration and through Application Program Interfaces.

Artificial Intelligence and Machine Learning

The invention provides for the use of artificial intelligence and machine learning to provide suggestions and alternatives for solution functions. For example, AI/ML may detect documents being shared to the same set of users and suggest the creation of a group. Or, AI/ML may detect that a document being saved is associated with other documents and suggest that all of the related files be saved. Or, AI/ML may suggest the use of hashtags and descriptive text for documents. AI/ML will be assistive and educational in nature, and not controlling.

BRIEF DESCRIPTION OF THE DRAWINGS

Preferred and alternative examples and embodiments are described in detail below with reference to the following drawings.

DETAILED DESCRIPTION

Definitions

Figure 1A:
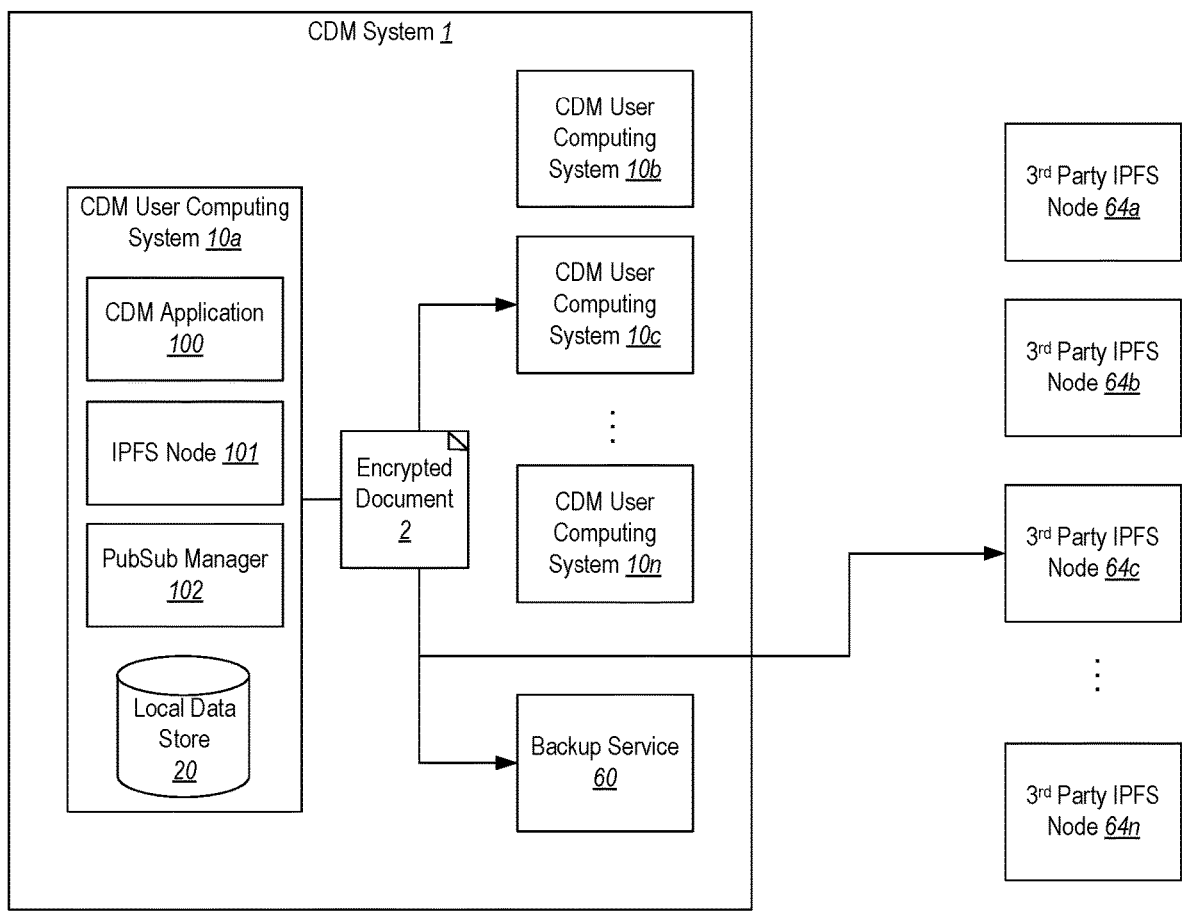
FIG. 1A is a system diagram of the described system according to one embodiment.

Decentralized: The implementation of a distributed group of nodes where there is no controlling node and all nodes have the same capabilities.

Distributed: The implementation of identical and separate nodes of an application that perform automatic synchronization of data and processes.

HIPAA: The Healthcare Insurance Portability and Accountability Act. A regulatory framework for health information.

IPFS: InterPlanetary File System. The implementation of an open source decentralized and distributed file system.

Jitsi: An open source video conferencing solution.

Pinning: In the context of IPFS, the process of making a file permanent in an IPFS node that is exempt from automatic deletion.

PubSub: Publish/Subscribe. The implementation of an open source messaging system based on a publish and subscribe architecture.

System Overview Diagrams

The described techniques provide a user and business collaboration and document management solution based on Web 3.0 technologies, including the InterPlanetary File System (IPFS) or similar distributed and decentralized storage methods, and the Publish/Subscribe (PubSub) message protocol or similar distributed messaging methods. As a fully decentralized and distributed solution, information is shared through cryptographically secure and resilient Web 3.0 mechanisms. The solution provides a number of secure collaboration services. Users can securely add, update, delete, archive and share documents on the IPFS file system. Local directory synchronization automates this task. Communication between users on different nodes is facilitated through secure messaging, chat and video functions based on secure PubSub methods. Integrations with third party applications are facilitated through an extensible interface. A localized encryption key and secrets vault is used to protect data encryption keys, authentication credentials, and related secrets.

A GUI user interface is provided as well as a command line facility and application program interfaces to facilitate user and third party integration. Both public and private implementations are supported in order to meet a variety of use cases, security, and compliance requirements. artificial intelligence (AI) and machine learning (ML) processes provide assistance in a variety of functions and operations. FileCoin and similar incentivized storage options are used for a variety of implementations.

The figures show an example system architecture adapted to support one embodiment of the invention. The following figures use reference numerals to identify like elements. A letter after a reference numeral, such as "113A" indicates that the text refers specifically to the element having that particular reference numeral. A reference numeral in the text without a following letter, such as "113" refers to any or all of the elements in the figures bearing that reference numeral (e.g., "113" in the text refers to reference numerals "113A" and/or "113B" in the figures).

Figure 1B:
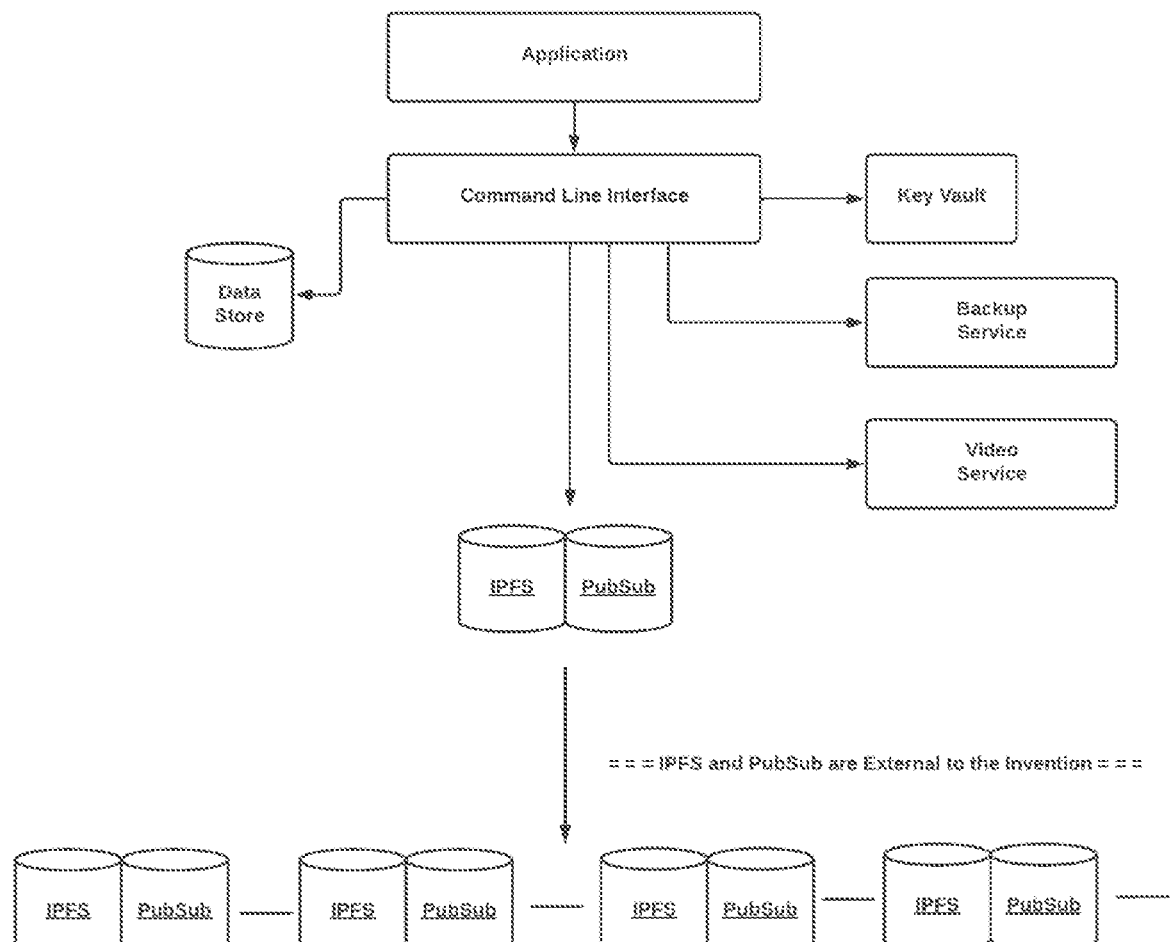
FIG. 1B is a system diagram of the Web3 collaboration system based on IPFS and PubSub, in accordance with an embodiment of the invention.
Figure 1C:
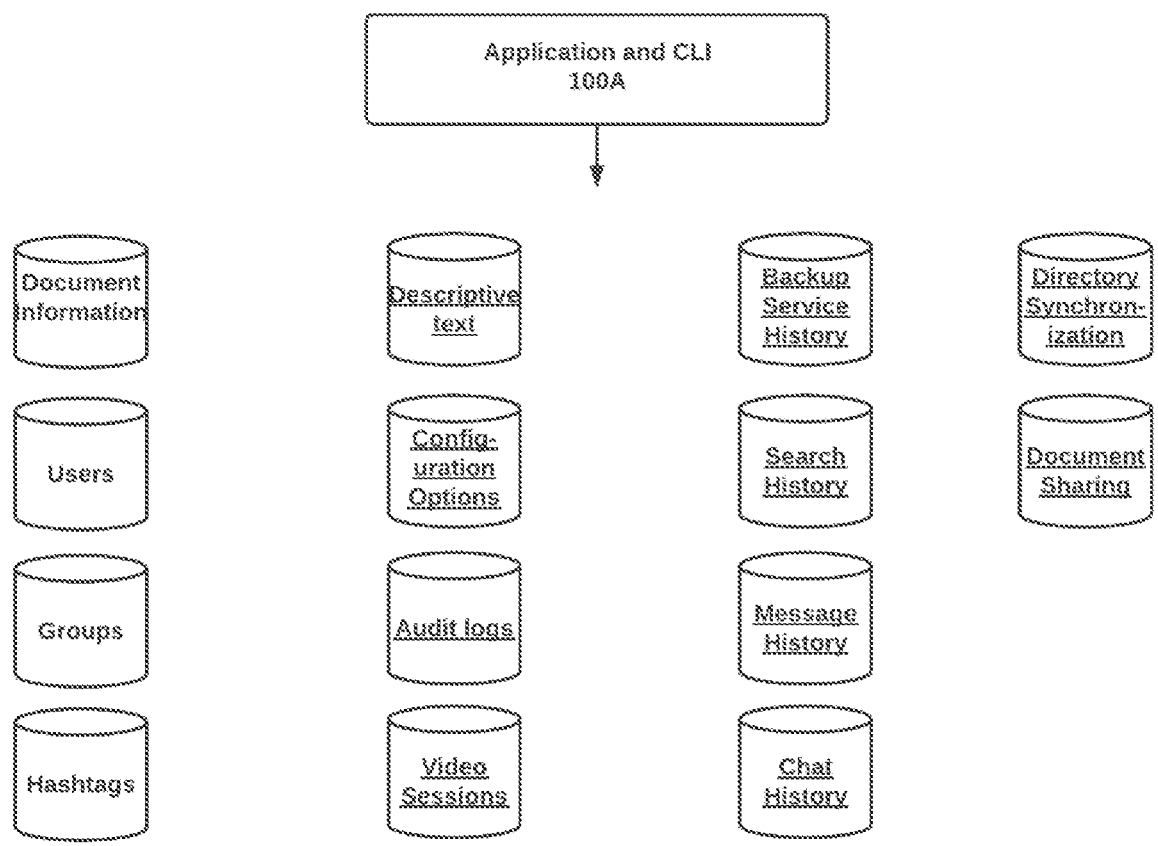
FIG. 1C is a system diagram of the various data stores used in example embodiments of the invention.

FIGS. 1A-1C provide an overview of a system configured according to example embodiments. More particularly, FIG. 1A shows an example Collaboration and Document Management (CDM) system 1 provided by example embodiments. The system 1 includes multiple CDM user computing systems 10 and a backup service 60. The system 1 interacts with the global IPFS file system, as represented by the collection of third-party IPFS nodes 64. Each user computing system 10 hosts its own IPFS node 101 and thus may store documents created by the third-party nodes 64. In addition, documents created by the user computing systems 10 may also be stored by third-party nodes 64.

A CDM user computing system 10 is operated by a user of the system 1 to manage and collaborate with respect to documents stored in the IPFS file system. Each of the user computing systems 10 includes a CDM application 100, an IPFS node 101, a PubSub manager 102, and a local data store 20. The CDM application 100 is responsible for managing the creation, encryption, distribution, and sharing of documents. When a document is created, it is encrypted and stored by the local IPFS node 101. The encrypted document may be further distributed to one or more other IPFS nodes 101 or 64, such as those hosted by other CDM user computing systems (e.g., computing system 10c) or even third-party IPFS nodes (e.g., node 64c).

In typical embodiments, when a document is created and/or saved, it may also be stored by the backup service 60. The backup service may store the document in its own local storage (e.g., because it also hosts an IPFS node), on third-party IPFS nodes, on cloud-based storage systems (e.g., Amazon S3), or the like.

In typical embodiments, the elements of the system 1 communicate with one another using a publish/subscribe protocol. Secure PubSub messages are sent between elements of the system 1 to instruct nodes to perform operations such as sharing, deleting, pinning, and the like. As one example, if the user of computing system 10a wishes to share a document with the user of computing system 10c, a secure PubSub message would be sent from system 10a to 10c instructing system 10c to pull the document from system 10a. Once the document was received, stored, and pinned by system 10c, a PubSub response would be sent from system 10c to 10a confirming the sharing operation.

The local data store 20 may be used to store one or more of: document information (e.g., hashtags, keywords, descriptive text), messages, audit information, user/group information, search history, and the like. The local data store 20 may be logically and/or physically decomposed into purpose-specific data stores such as are shown and described with respect to FIG. 1C, below, FIG. 1B shows the modules of a typical CDM user computing system. The modules include the CDM application 100, a command line interface, a local data store, a key vault, IPFS storage, a PubSub queue, and the like. In some embodiments, one or more of these modules may not be present. For example, the command-line interface may be replaced or supplemented with a programmatic API and/or graphical user interface.

Referring now to FIG. 1C, there is shown the system architecture of data stores used by an example embodiment of the invention. Data stores are used for persistent representation of application information and user options not including IPFS. Data stores may be implemented as relational database tables, No-SQL data lakes, or other instantiation of information storage.

Add a Document

Figure 2:
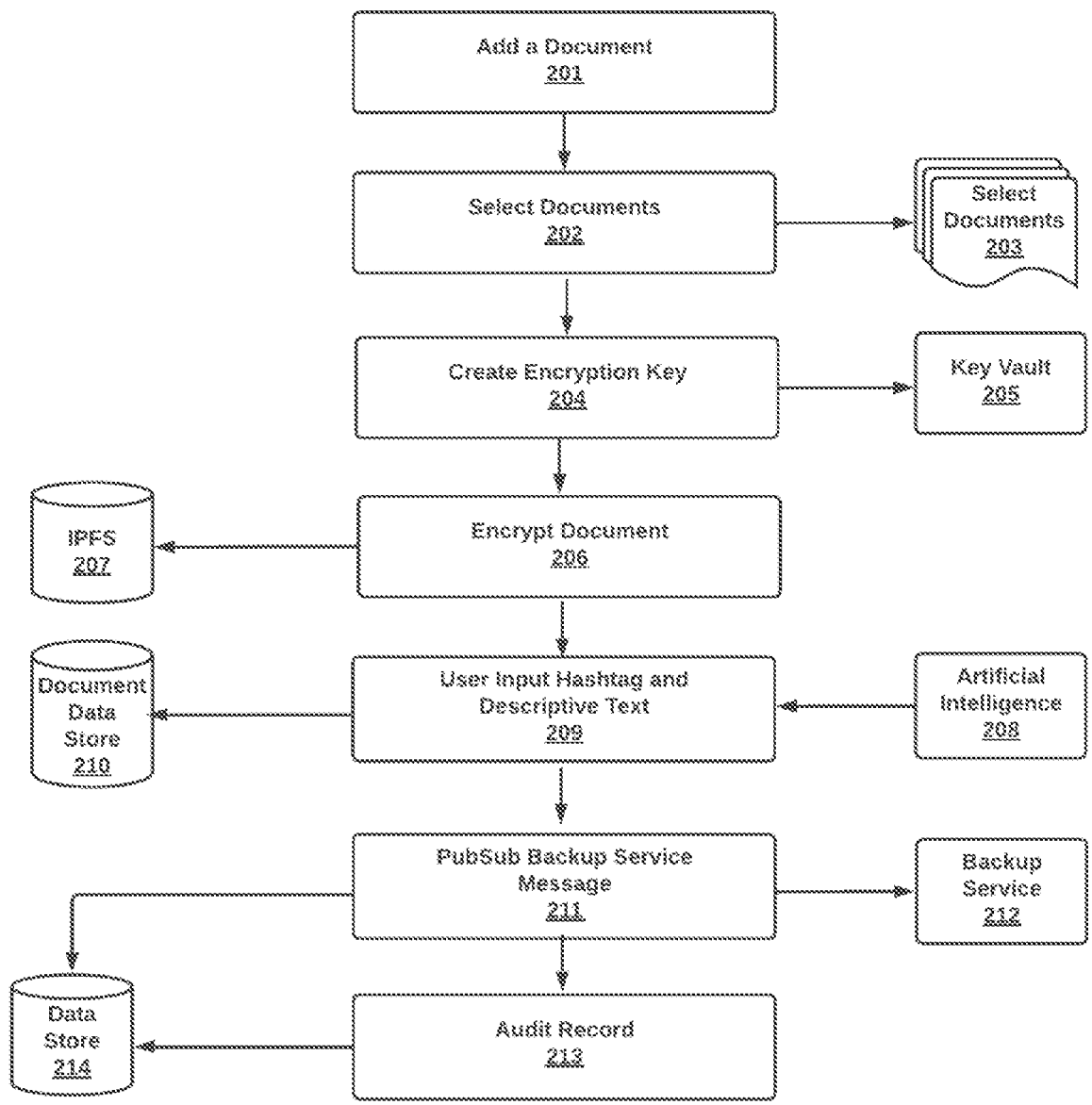
FIG. 2 is a flow diagram illustrating the process of securing and adding a document to IPFS.

Referring now to FIG. 2 there is shown a system architecture of securely adding a document to IPFS. Adding a document involves a user action 201 to select 202 one or more documents 203. For each document: A unique encryption key is created 204 and stored in the key vault 205. The encryption key may be a symmetric encryption key created using a NIST-approved random bit generator. The key may be stored in a key vault that is indexed by an IPFS content identifier or similar unique identifier. The document is encrypted 206 with the encryption key and the document is stored in IPFS storage 207 in a permanent state. The artificial intelligence application 208 is accessed to suggest one or more hashtags and descriptive text, which the user may accept, reject, or modify. The user optionally enters one or more hashtags and descriptive text 209 and these are stored in the document data store 210. The document name and content identifier are also stored in the document data store 210. A secure PubSub message (see FIGS. 22A-B) is created 211 with the content identifier and other information, and sent to the backup service 212. A local audit record is created 213 and added to the audit data store 214. A secure PubSub response message is received from the backup service 212 to confirm the backup operation and the document data store 210 is updated with the backup information. Information about the document is written 213 to the audit data store 214.

Update a Document

Figure 3:
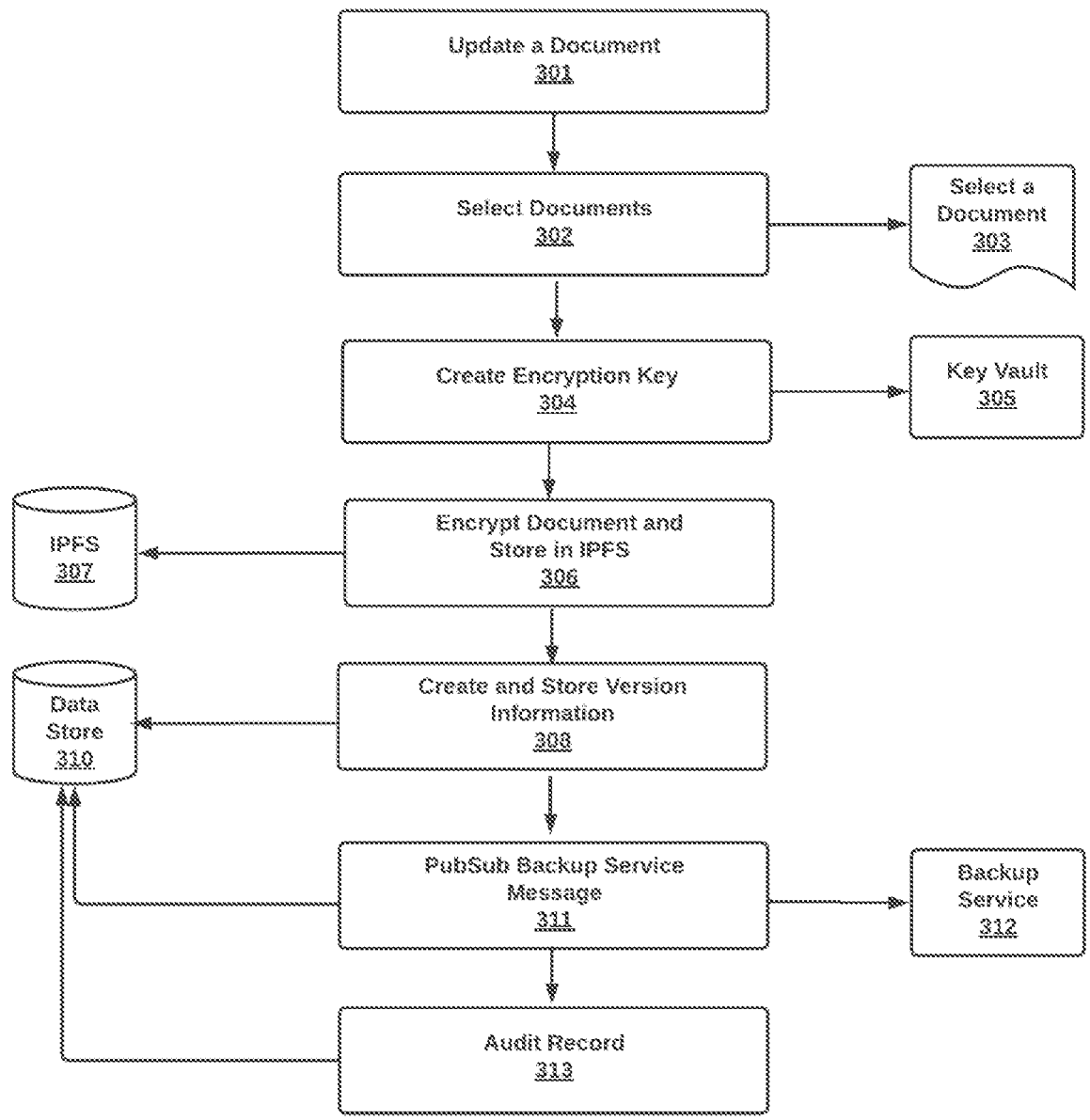
FIG. 3 is a flow diagram illustrating the process of securely updating a document in IPFS.

Referring now to FIG. 3 there is shown a system architecture of updating a document. Updating a document involves a user action 301 to select 302 one document 303 for update. For the selected document a unique encryption key is created 304 and stored in the key vault 305. The document is encrypted 306 with the encryption key and stored in IPFS storage 307 in a permanent state. Typically, the document is encrypted using the AES block cipher in GCM (Galois/Counter Mode) mode, although other encryption processes or modes may be used instead.

The document name and content identifier are stored 308 in the document data store 310 as a new version. Hashtags and descriptive text (possibly suggested by an artificial intelligence engine) may also be stored in the data store 310. A secure PubSub message (see FIGS. 22A-B) is created 311 with the content identifier and other information, and sent to the backup service 312. A local audit record is created and added to the audit data store 310. A secure PubSub response message is received from the backup service 312 to confirm the backup operation and the document data store 310 is updated with the backup information. Information about the document is written 313 to the document data store and to the audit data store.

Delete a Document

Figure 4:
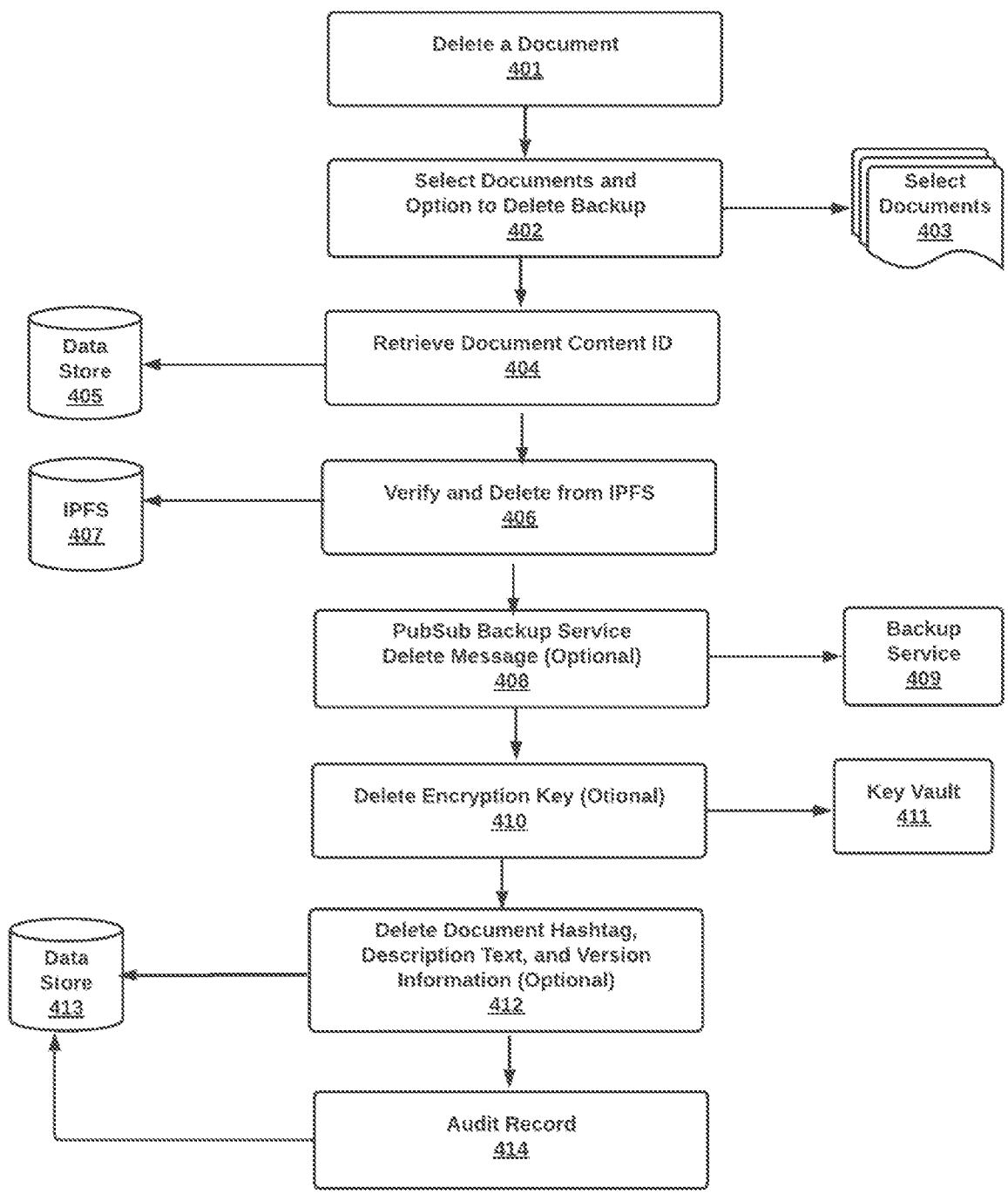
FIG. 4 is a flow diagram illustrating the process of deleting a document from IPFS.

Referring now to FIG. 4 there is shown a system architecture of deleting documents 401. Deleting documents involves a user action 402 to select one or more documents 403 for deletion. For each selected document: the document content identifier is retrieved 404 from the document store 405. The selected document is deleted 406 from the IPFS storage system 407. The document content identifier may also be sent to shared recipients via a secure PubSub message.

Deletion from the backup service may be handled in different ways by different embodiments. In some embodiments, the document is by default automatically also deleted from the backup service. In other embodiments, deletion from the backup service is only performed in response to a request or indication from the user. If the user does not request deletion from the backup service, then the document will be retained there. If the user does request deletion from the backup service, then the selected document is deleted 408 from the backup service 409 by sending a secure PubSub message (see FIGS. 22A-B) to the backup service. If the backup image of the document is deleted from the backup service, the encryption key for the document is deleted 410 from the key vault 411. If the backup image of the document is deleted the hashtags, descriptive text and version information is also deleted 412 from the local data store 413. A local audit record is created and added to the audit data store 414.

Some embodiments provide bulk deletion functionality. For example, all documents owned by a specified user may be deleted. As another example, all documents matching a user-specified hashtag may be deleted.

Read a Document

Figure 5:
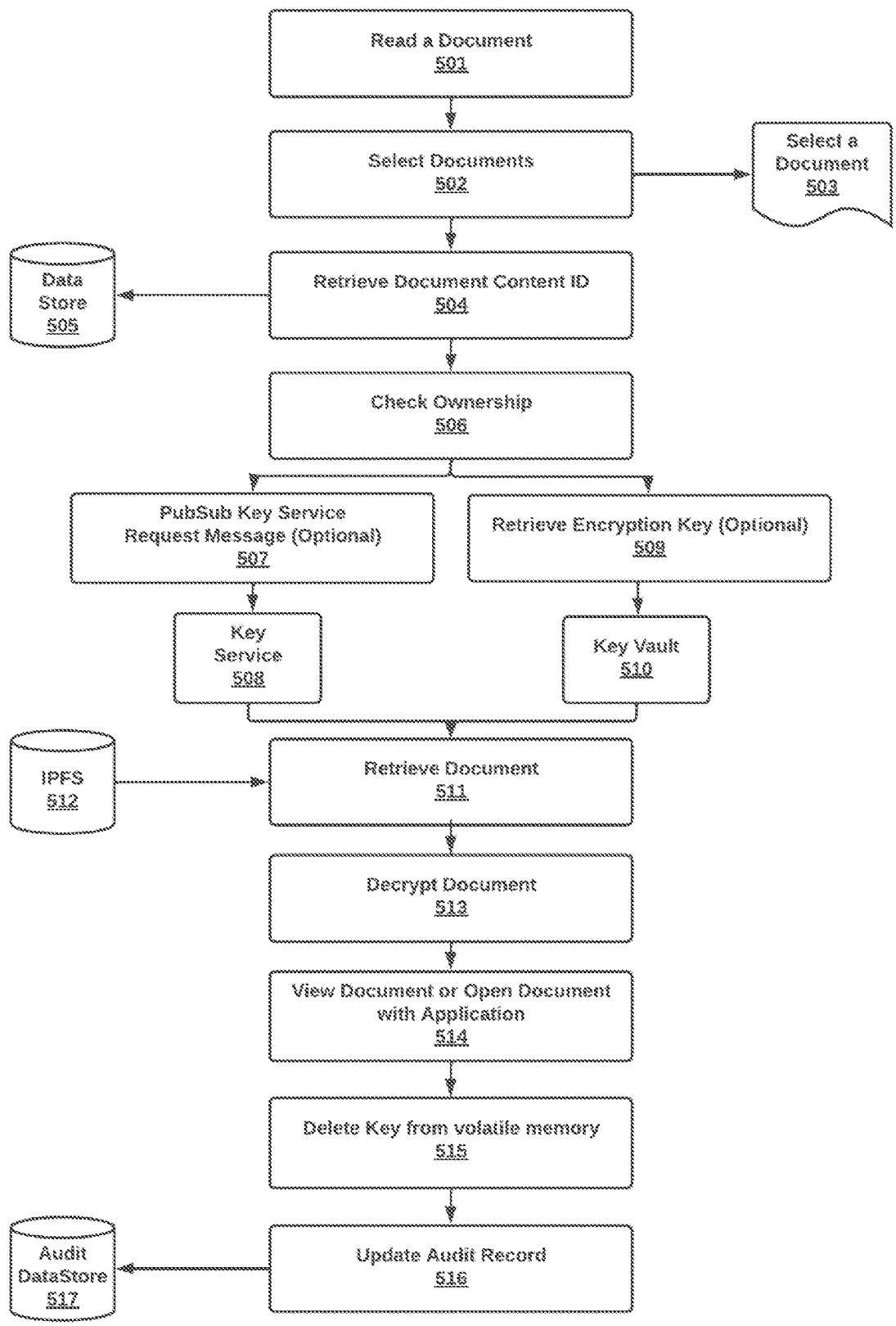
FIG. 5 is a flow diagram illustrating the process of reading and decrypting a document stored on IPFS.

Referring now to FIG. 5 there is shown a system architecture of reading a document 501. Reading a document involves a user action 502 to select a document for reading. For the selected document: the document content identifier is retrieved 504 from the document store 505. Ownership of the document is verified 506; if the user making the read request does not have ownership or permission to read the document then use PubSub (see FIGS. 22A-B) to request the key 507 from the owner's key vault 508 OR if the user making the read request already has ownership of or permission to view the document then request the encryption key 509 from the user's private vault 510. After the encryption key request has been approved, retrieve the document 511 from IPFS 512 and decrypt it 513. Give the user the option to view the document or open the document with an external application 514. The document may be viewed through an application that prevents modification or saving of the document. Also, the document and related hashtags and descriptive text may be analyzed by an artificial intelligence engine to summarize key aspects of the document. Securely delete the encryption key from local memory 515. The document's audit record is updated 516 and saved in the audit data store 517.

Searching a Document

Figure 6:
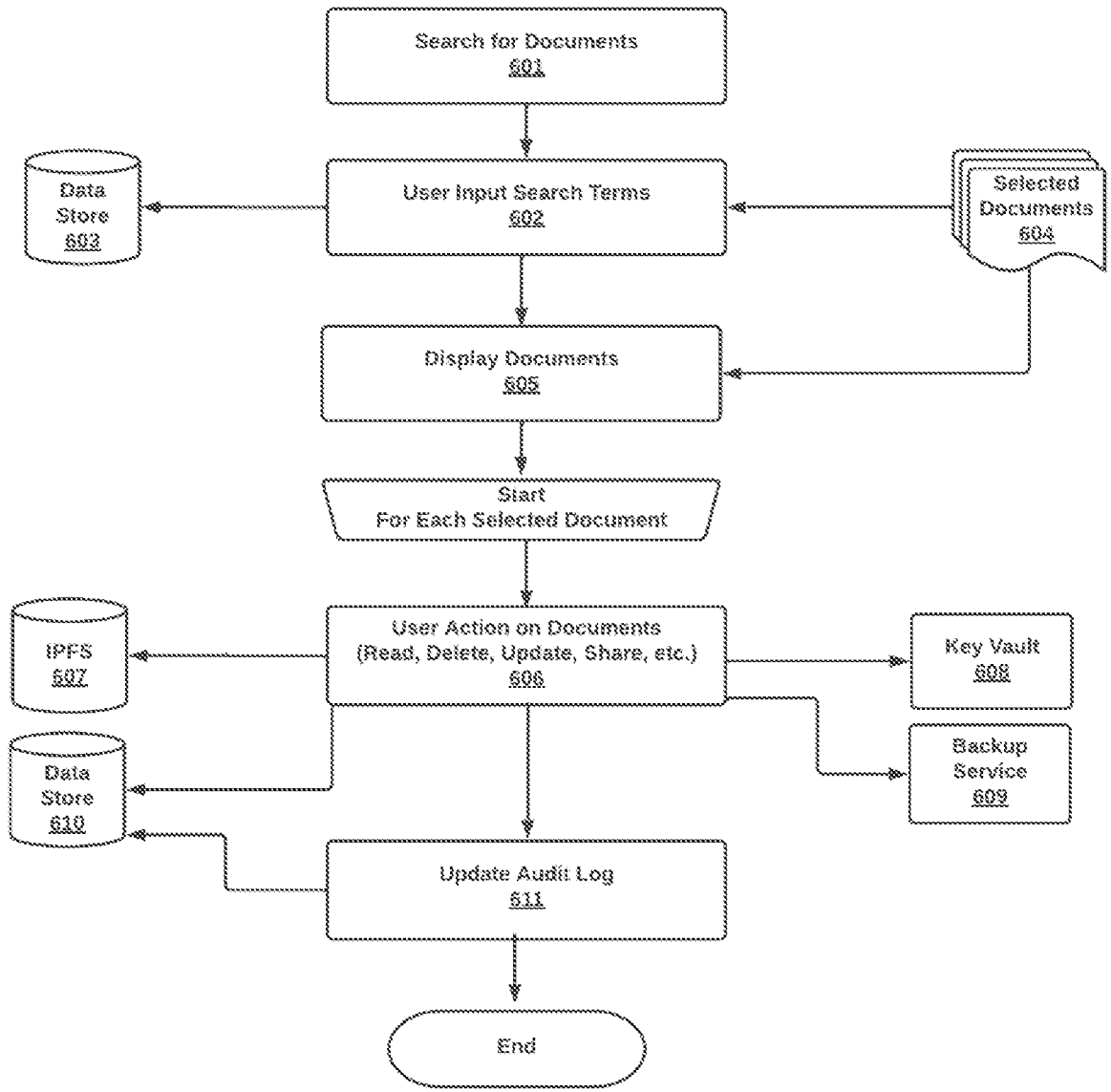
FIG. 6 is a flow diagram illustrating the process of searching for a document that is securely stored on IPFS.

Referring now to FIG. 6 there is shown a system architecture of searching for one or more documents 601. Searching for documents involves a user action 602 to select one or more documents using hashtags, descriptive text, create date or date range, last update date or date range, and other search information for inclusion in the search. The data store 603 is read to match search terms and select documents 604. The search may be conducted over remote IPFS nodes (where document sharing is enabled) and/or over the public IPFS file system. In some embodiments, an artificial intelligence application suggests additional search terms.

The selected documents 604 are displayed 605 to the user. The user may take one or more actions 606 on the selected documents 604 including but not limited to reading, updating, deleting, sharing, and backing up documents stored on IPFS. The key vault 608, IPFS storage 607, backup service 609 and document store 610 are updated as appropriate to the action. Actions on documents are logged 611 to the local audit data store 610.

Sharing Documents

Figure 7:
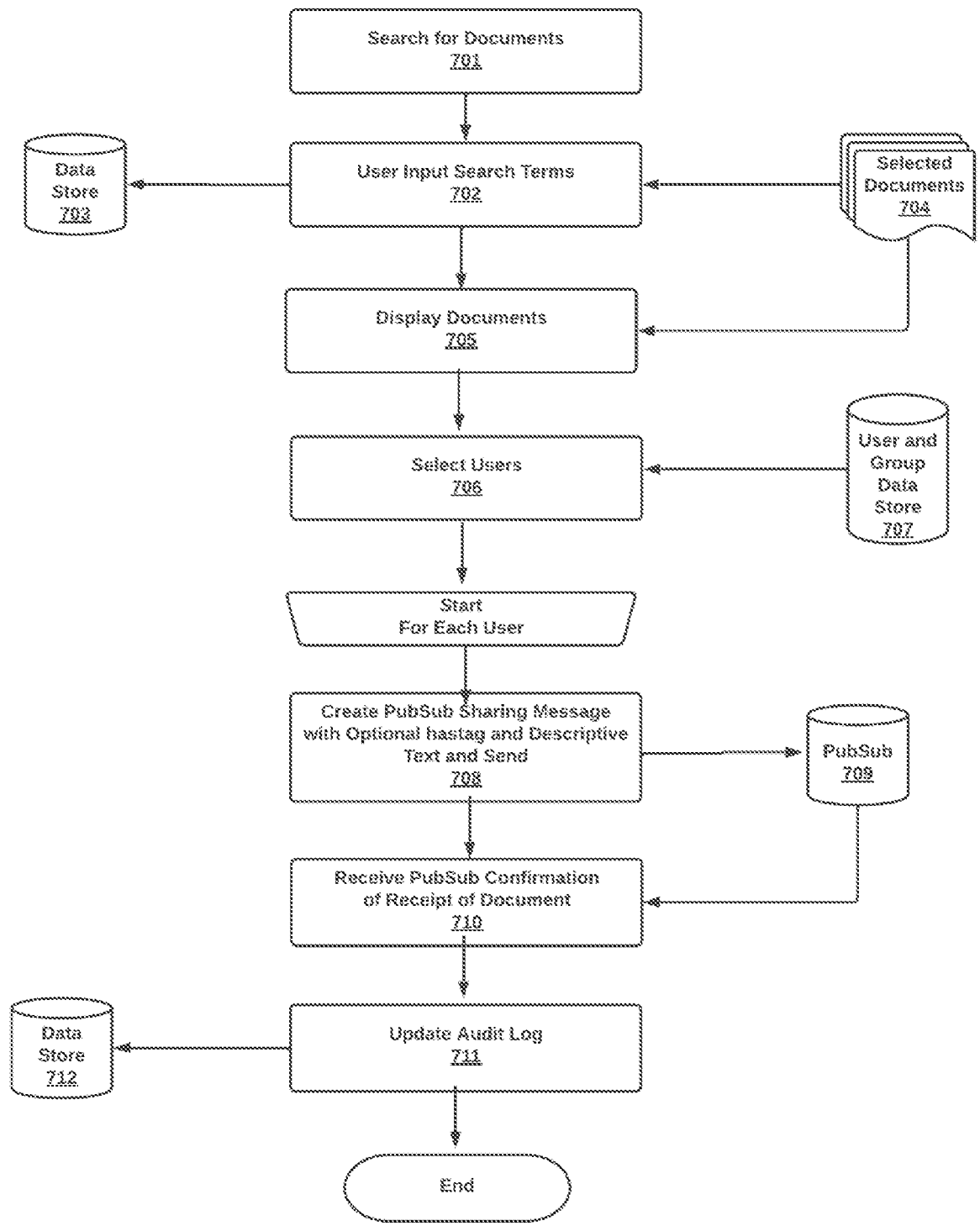
FIG. 7 is a flow diagram illustrating the process of sharing an encrypted document using IPFS and secure PubSub messages.

Referring now to FIG. 7 there is shown a system architecture of sharing one or more documents 701 with one or more users. Sharing documents involves a user action 702 to search 703 for one or more documents 704 using hashtags, descriptive text, create date or date range, last update date or range, and other search information. The data store 703 is read to match search terms and select documents 704. The selected documents 704 are displayed 705 to the user. The user then may select one or more recipient users 706 for the selected documents 704 for sharing by accessing the list of users and groups 707. For all selected users 707 a secure PubSub message (e.g., encrypted with the recipient's public key) with optional hashtag and descriptive text information is created 708 (see FIGS. 22A-B) and sent 709 to the recipients. The PubSub message may include an indication of the recipient node, IPFS document content identifier, and other document information.

For each recipient user the PubSub message 709 is received and verified. The shared document is pulled to the recipient's IPFS node and made permanent with IPFS pinning. A secure response PubSub message 709 is returned to the sender 710 to confirm receipt of the document. The sharing actions are logged 711 to the local audit data store 712.

Figure 8:
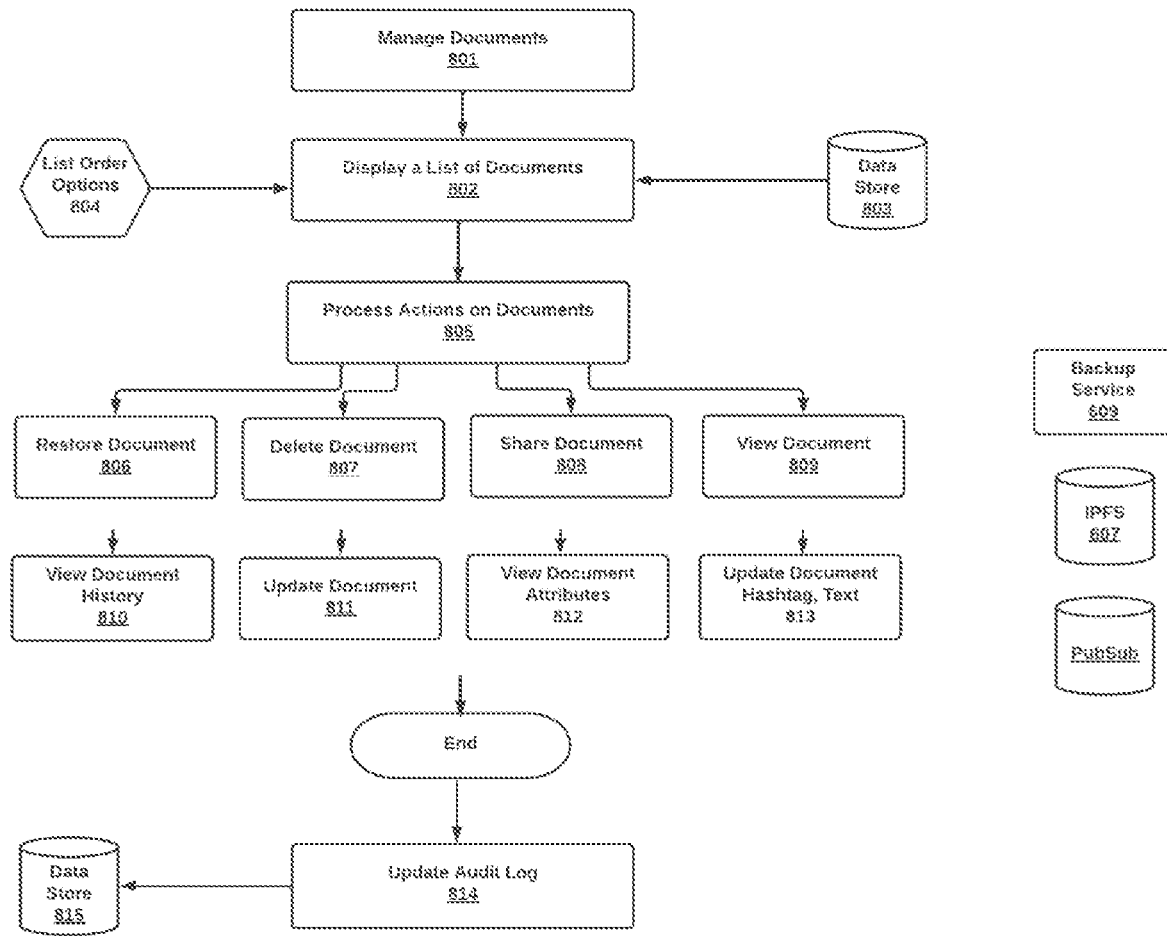
FIG. 8 is a flow diagram illustrating the process of managing secure documents on IPFS, with a user interface.

Various alternatives and extensions are contemplated. The document may be shared via email using GNU Privacy Guard (gpg), or other document encryption solution, to encrypt the document. The document may be shared to a cloud storage facility such as Dropbox, Amazon Web Services S3, Azure Storage, Google Cloud Storage, or other similar facility. The document may also or instead be shared with a medical entity using HIPAA compliant methods. In addition, a list of recommended users for sharing may be created by an artificial intelligence application Managing Documents Referring now to FIG. 8 there is shown a system architecture of managing documents 801 added by the user or shared with the user by remote users. The list of documents is retrieved from the data store 804 and displayed to the user 802 with options to change the order of the sorted display 803. Through the use of display options the user selects actions to perform on the documents 805. Actions that can be taken on documents include restoring a document 806, deleting a document 807, sharing a document 808, viewing a document 809, viewing the history of a document 810, updating a document 811, viewing a documents attributes 812, updating a document's hashtags and descriptive text 813, and other actions. An audit record is written 815 to the data store 814 for each action taken. Document attributes may include one or more of: file name or partial name, file create date or create date range, file update date or date range, one or more hashtags, full or partial descriptive text, sharing status with one or more users, sharing status with one or more groups, importance indicator for documents, IPFS content identifier, or the like.

Backing Up a Document

Figure 9:
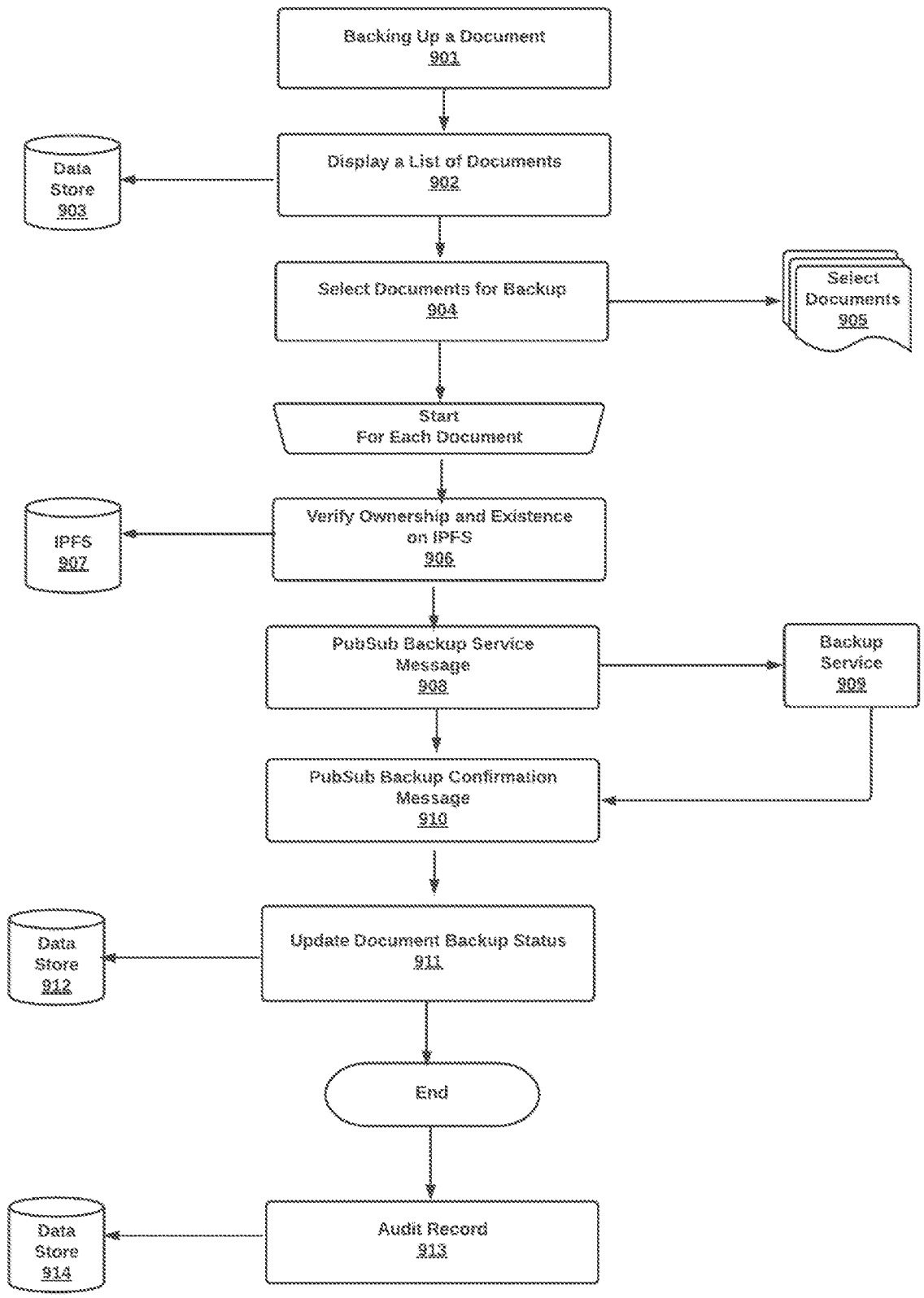
FIG. 9 is a flow diagram illustrating the process of backing up encrypted documents to a remote backup service using IPFS and PubSub.

Referring now to FIG. 9 there is shown a system architecture of automatically or manually initiated backup of IPFS documents 901 owned by the user. The list of documents is retrieved from the data store 902 and displayed to the user 903. The user selects the documents 905 to back up 904. For each selected document 905 the existence 907 and ownership of the document is verified 906. A secure PubSub message (see FIGS. 22A-B) is created 908 and sent to the backup service 909. The message typically will include the document name and content identifier. A secure PubSub confirmation message is received 910 from the backup service 909. The confirmation message will indicate that the document has been backed up or that it had been previously backed up. The backup status of the document is updated 911 in the document data store 912. After all processing is complete the audit log 914 is updated 913.

In some embodiments, the document can be designated as permanent, which will prevent deletion in the future. In some embodiments, the backup document is encrypted with a user-supplied symmetric key and cryptographic secret sharing is used to create multiple components of the symmetric key where a user designated number of those components can be used to reconstruct the symmetric encryption key. In some embodiments, the backup service is provided via FileCoin, or other incentivized distributed storage system.

Restoring a Document

Figure 10:
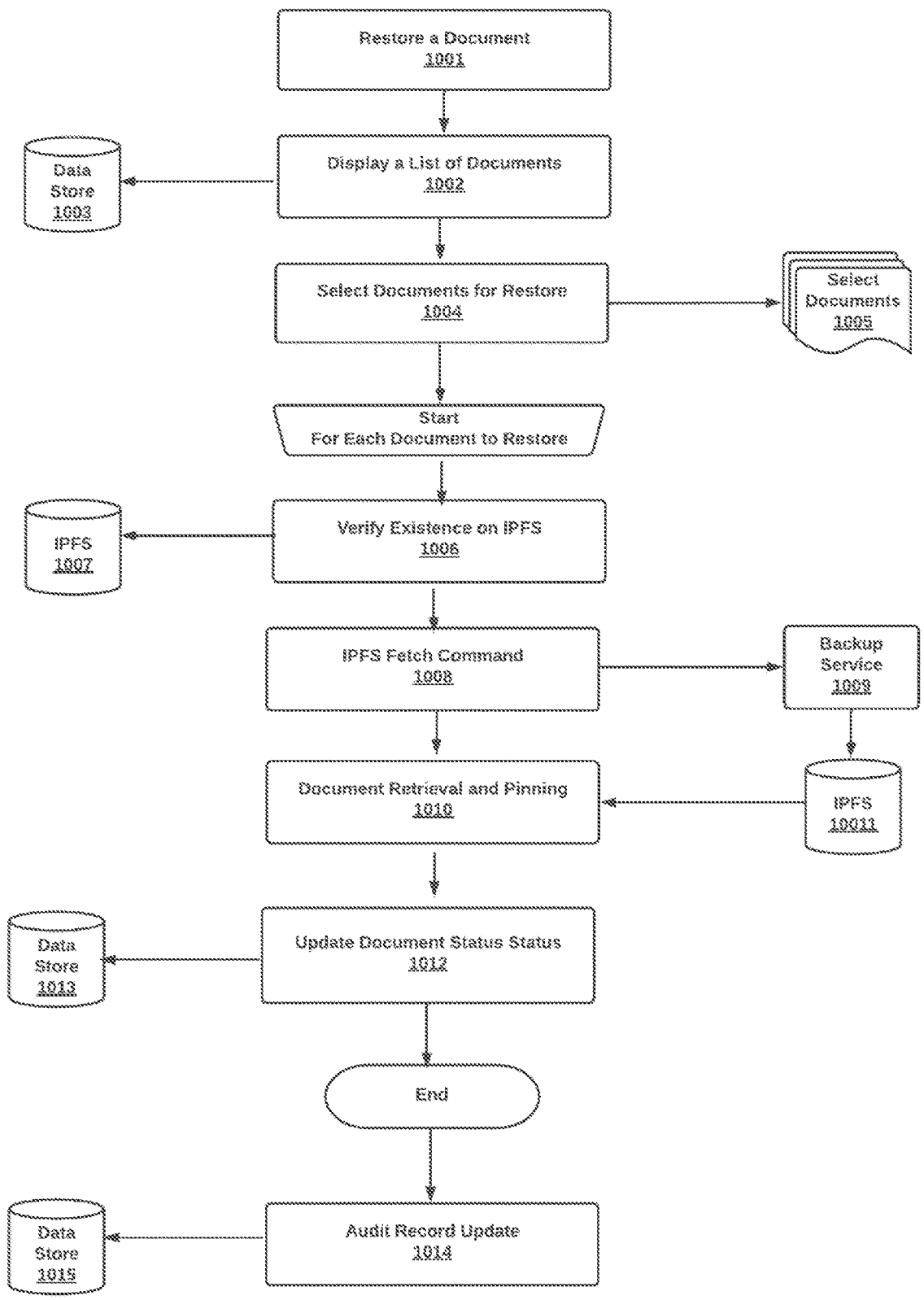
FIG. 10 is a flow diagram illustrating the process of restoring encrypted documents from a remote backup service using IPFS.

Referring now to FIG. 10 there is shown a system architecture of restoring documents 1001 possessed by the user. The list of documents is retrieved from the data store 1003 and displayed to the user 1002. The user selects the documents 1005 to restore 1004. For each selected document 1005 the existence 1006 of the document on IPFS is verified 1007. Using the document content identifier an IPFS document fetch command is issued 1008 and the document is retrieved from the backup service 1009 and made permanent with IPFS pinning on the local node 1010. In some embodiments, the document can be restored to another (remote) IPFS node. In addition, the restored document may be represented as a new version of the document in the versioning subsystem. The document status is updated 1012 in the data store 1013. After all processing is complete the audit log 1015 is updated 1014.

Send a User Message

Figure 11:
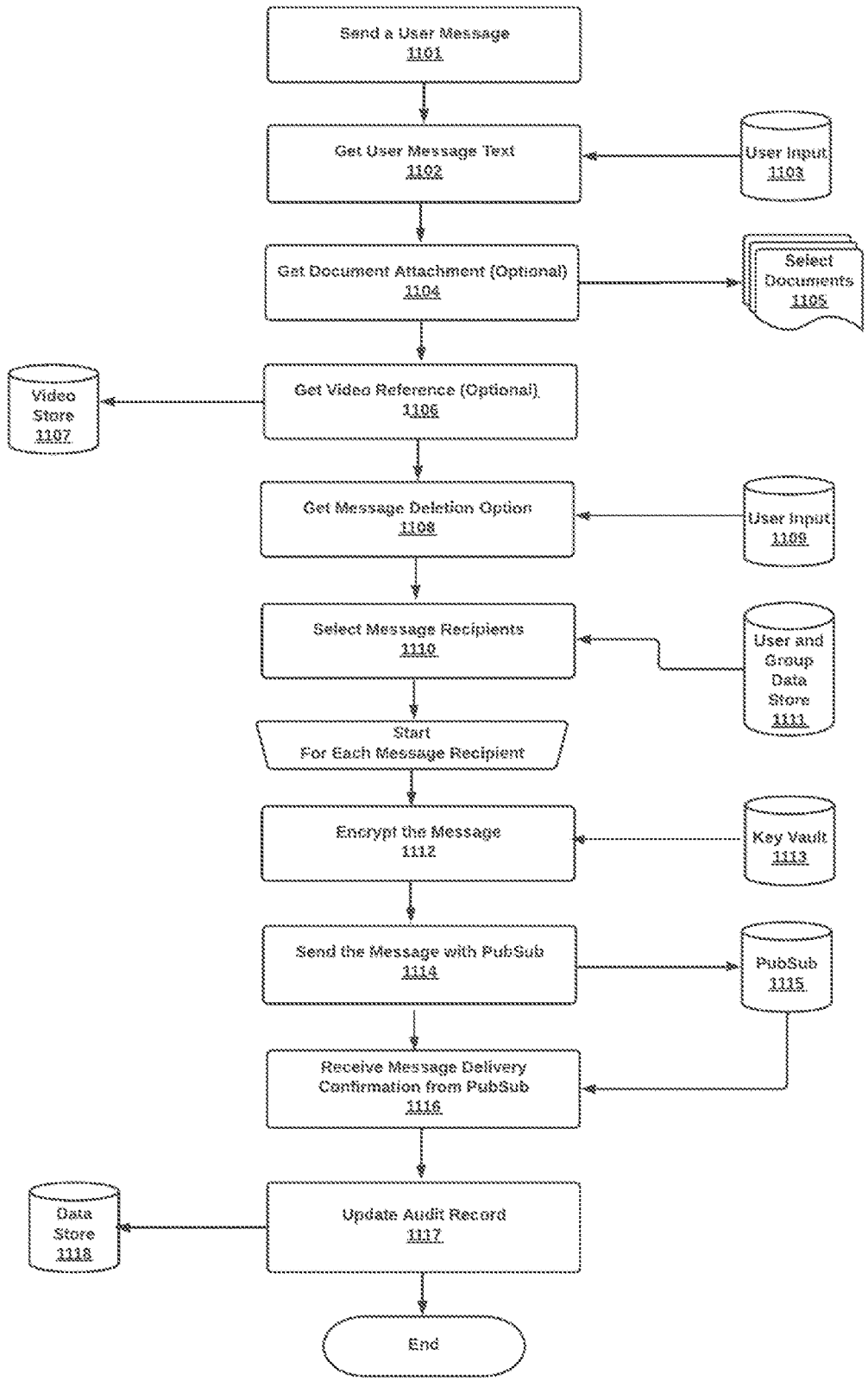
FIG. 11 is a flow diagram illustrating the process of sending a user a secure message using PubSub.

Referring now to FIG. 11 there is shown a system architecture of sending a user message 1101 with message text input 1102 from the user 1103. One or more documents 1105 may be selected 1104 to attach to the message 1103, and a video session identifier 1107 may be attached 1106 to the message 1103. The user may optionally specify an option for message deletion after read 1110 for the message 1103. The user then may select 1110 one or more users and groups 1111 to receive the message 1103. For each selected recipient: securing the message 1103 with encryption 1112 (see FIGS. 22A-B) using encryption keys from the key vault 1113, sending the message 1114 with PubSub 1115, receiving a confirmation of message of delivery 1116 from PubSub 1115, and writing an audit log entry 1117 in the data store 1118.

Multiple extensions and variations are contemplated. In one embodiment, delivered messages and/or their attachments are forwarded to one or more of: a mobile device as a text message; a recipient's email address; external messaging and collaboration solutions like Slack, Microsoft Teams, and the like; and customer support applications like Atlassian Jira, ServiceNow, and the like; an online fax service. In some embodiments, the messages are themselves encrypted and saved to IPFS.

Chat with a User

Figure 12:
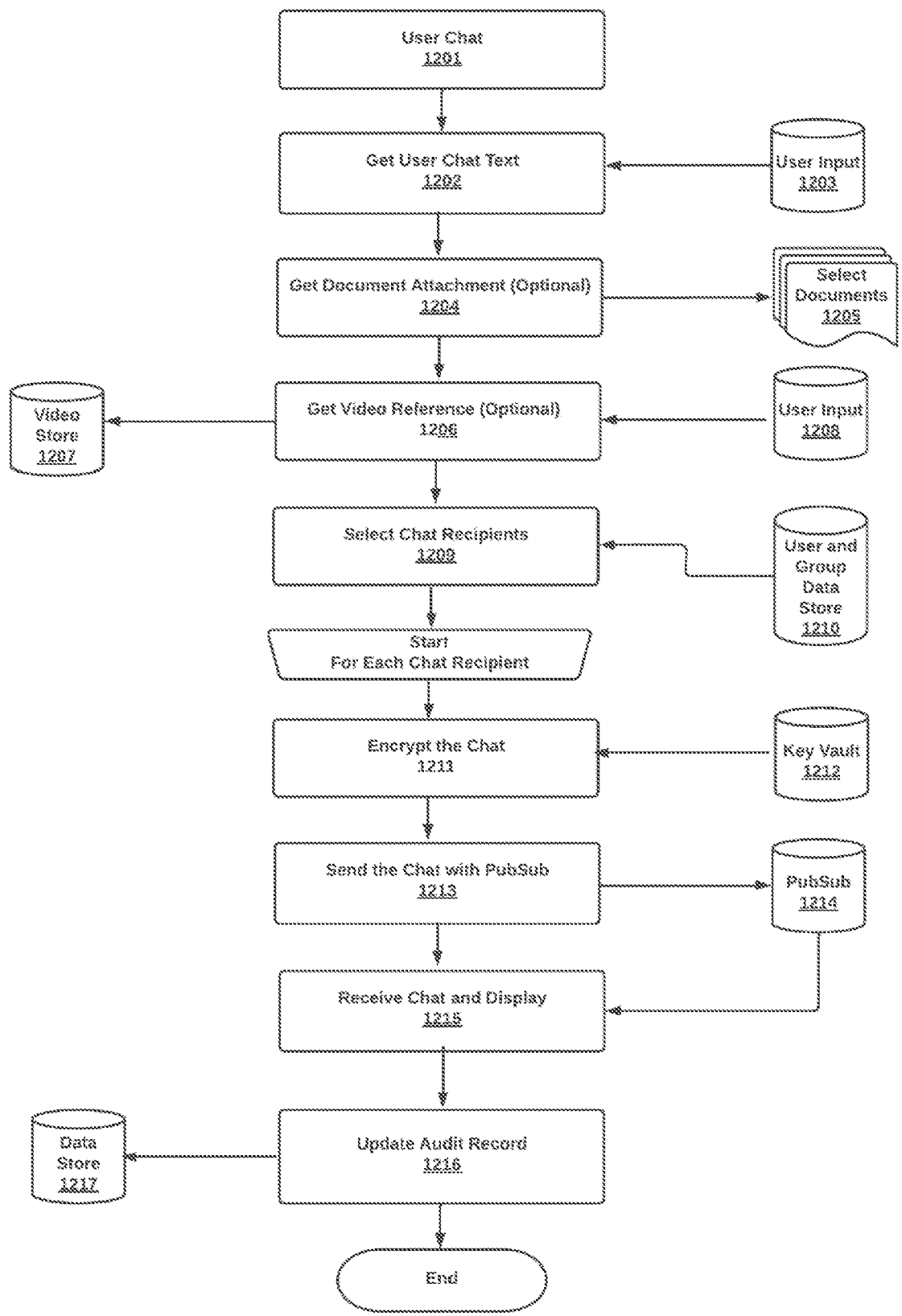
FIG. 12 is a flow diagram illustrating the process of securely chatting with a user using PubSub.

Referring now to FIG. 12 there is shown a system architecture of enabling a chat session with a remote user 1201. The user 1202 creates a chat message 1203. The user may select 1204 one or more documents 1205 to attach to the chat message. The user may select 1206, 1208 a video session reference 1207 to attach to the chat. The user then selects 1209 one or more users and groups 1210 to receive the chat message. For each selected recipient: the chat message is encrypted 1211 (see FIGS. 22A-B), and sent to the recipient 1210 via PubSub 1214. Chat messages sent by the remote user 1201 are read from PubSub 1214, decrypted (see FIGS. 22A-B), and displayed to the user 1215. An entry is written 1216 to the audit log in the data store 1217. This process is repeated until the user closes the session.

In some embodiments, the recipient of a chat message automatically invokes an artificial intelligence service to respond to the chat with user-provided responses. In other embodiments, the user can set a flag indicating that they are away (not available for chat). In some cases, a chat session log is created, encrypted and saved to IPFS after the chat session ends.

Video

Figure 13:
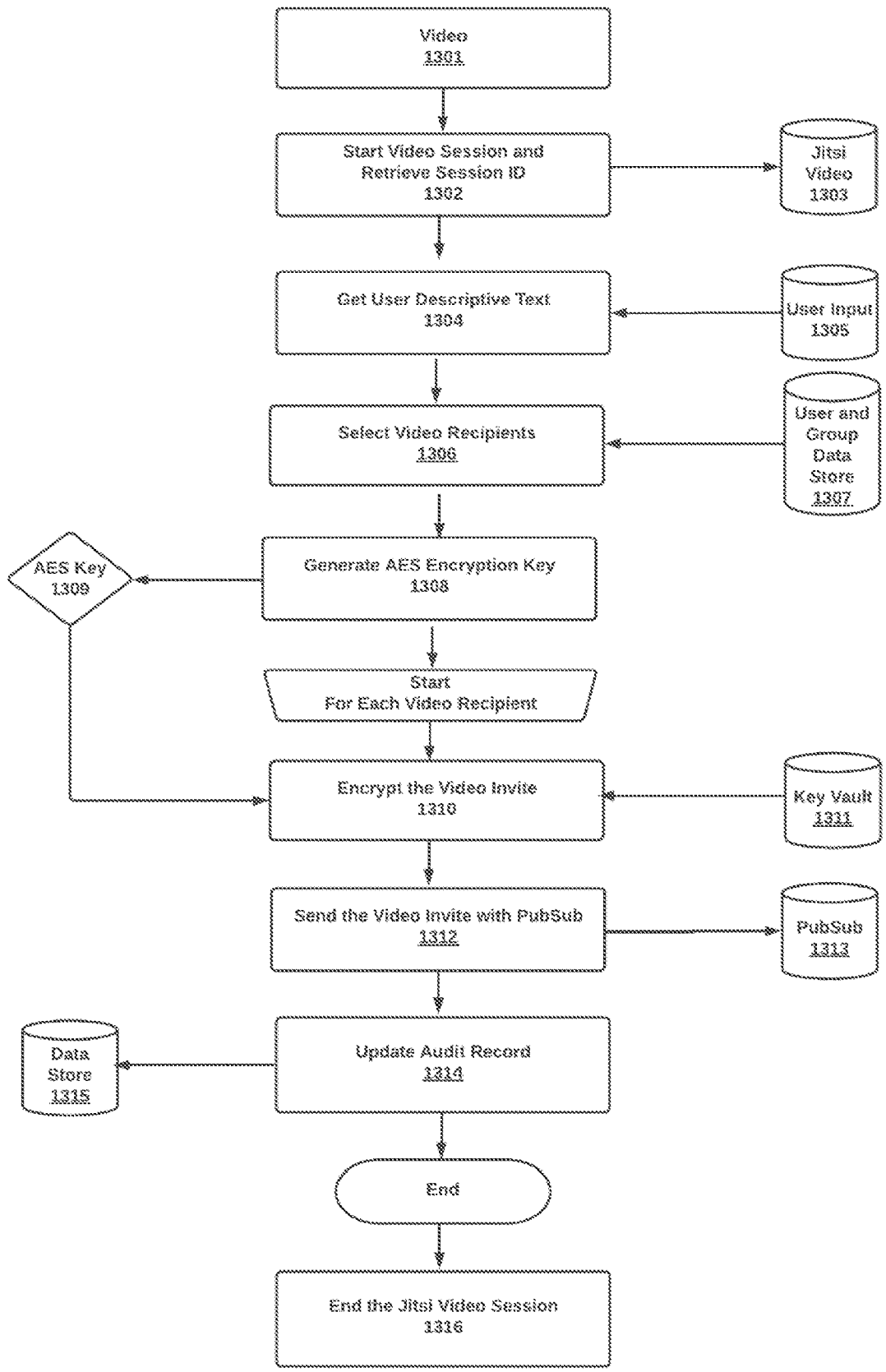
FIG. 13 is a flow diagram illustrating the process of starting a video session using secure Pub Sub messages.

Referring now to FIG. 13 there is shown a system architecture of starting an externally hosted video session with one or more remote users 1301. The user starts 1302 a video session 1303 and retrieves the video identifier. The user then adds 1304, 1305 descriptive text about the video session. The user then selects 1306 one or more users or groups 1307 to invite to the video session. An encryption key 1309 is generated 1308 to protect the video invitation message. For each recipient of the video invitation: the video invitation text is encrypted 1310 (see FIGS. 22A-B). The encrypted video invitation is then sent 1312 to each of the selected users 1307 via PubSub 1313. The audit data store 1315 is updated 1314 for the session. Upon completion the video session is ended 1316 and a recording optionally encrypted and stored on IPFS.

In some embodiments, a participant in a video session can join via a phone call. Also, a participant may be enabled to invite other users to a video session by email. Further, the video session may be recorded and then securely saved to the backup service system, which may be provided by FileCoin or similar. In some embodiments, a third party video conferencing application can be used for video sessions.

Video Scheduling

Figure 14:
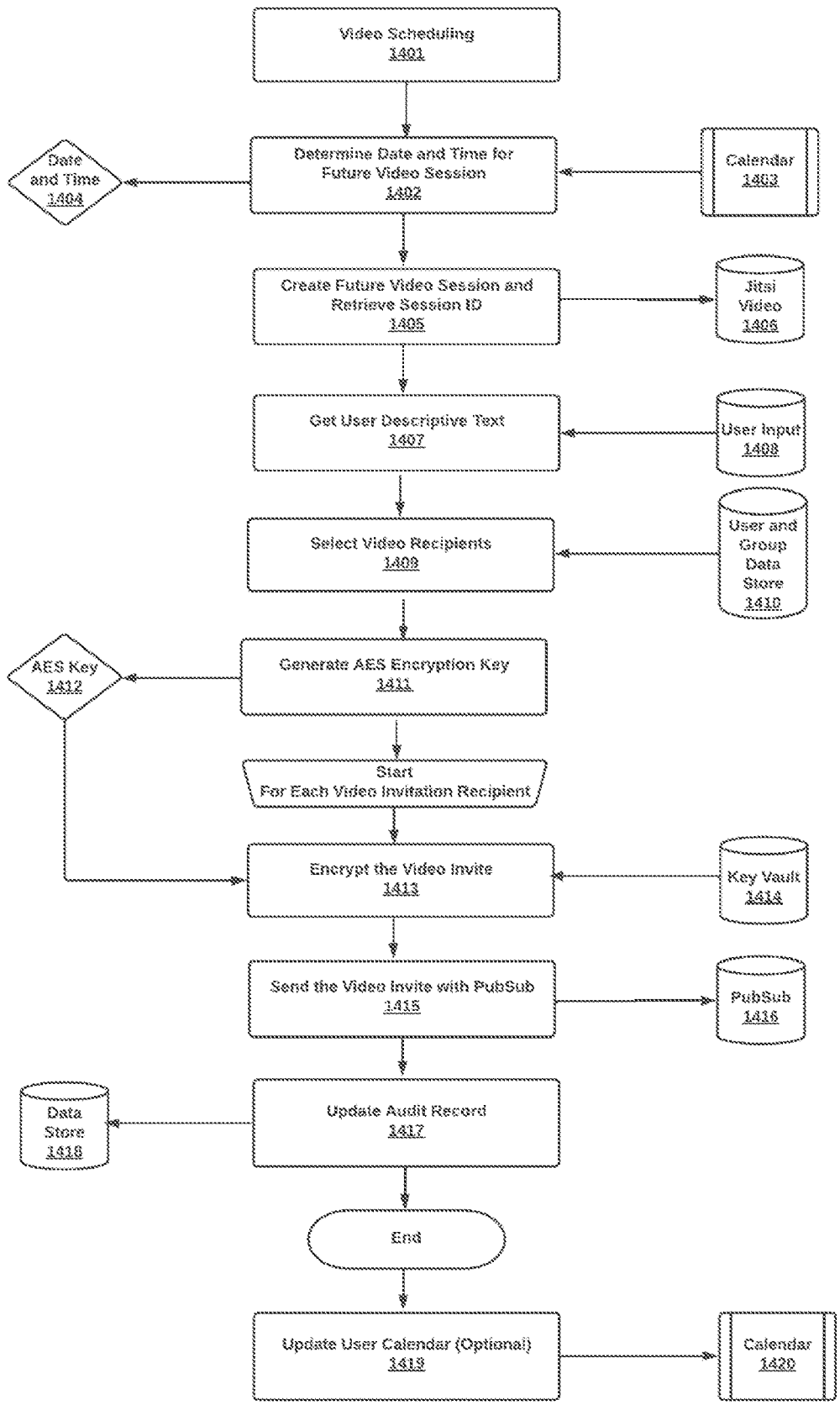
FIG. 14 is a flow diagram illustrating the process of scheduling a video session using secure PubSub messages.

Referring now to FIG. 14 there is shown a system architecture of scheduling a future video session with one or more remote users 1401. The user accesses 1402 their calendar 1403 to determine a future date and time 1404 for a video session. Then the user accesses 1405 the video application 1406 to create a video session identifier. The user then adds 1407 descriptive text about the video session 1408. The user then selects 1409 one or more users or groups 1410 to invite to the future video session. The video invitation message is encrypted 1413 (see FIGS. 22A-B). The encrypted video invitation is then sent 1415 to the selected users via PubSub 1416. The audit data store 1418 is updated 1417 with the video information. Optionally, the user's calendar 1420 is updated 1419 for the future video session invitation.

Enroll Remote Users

Figure 15:
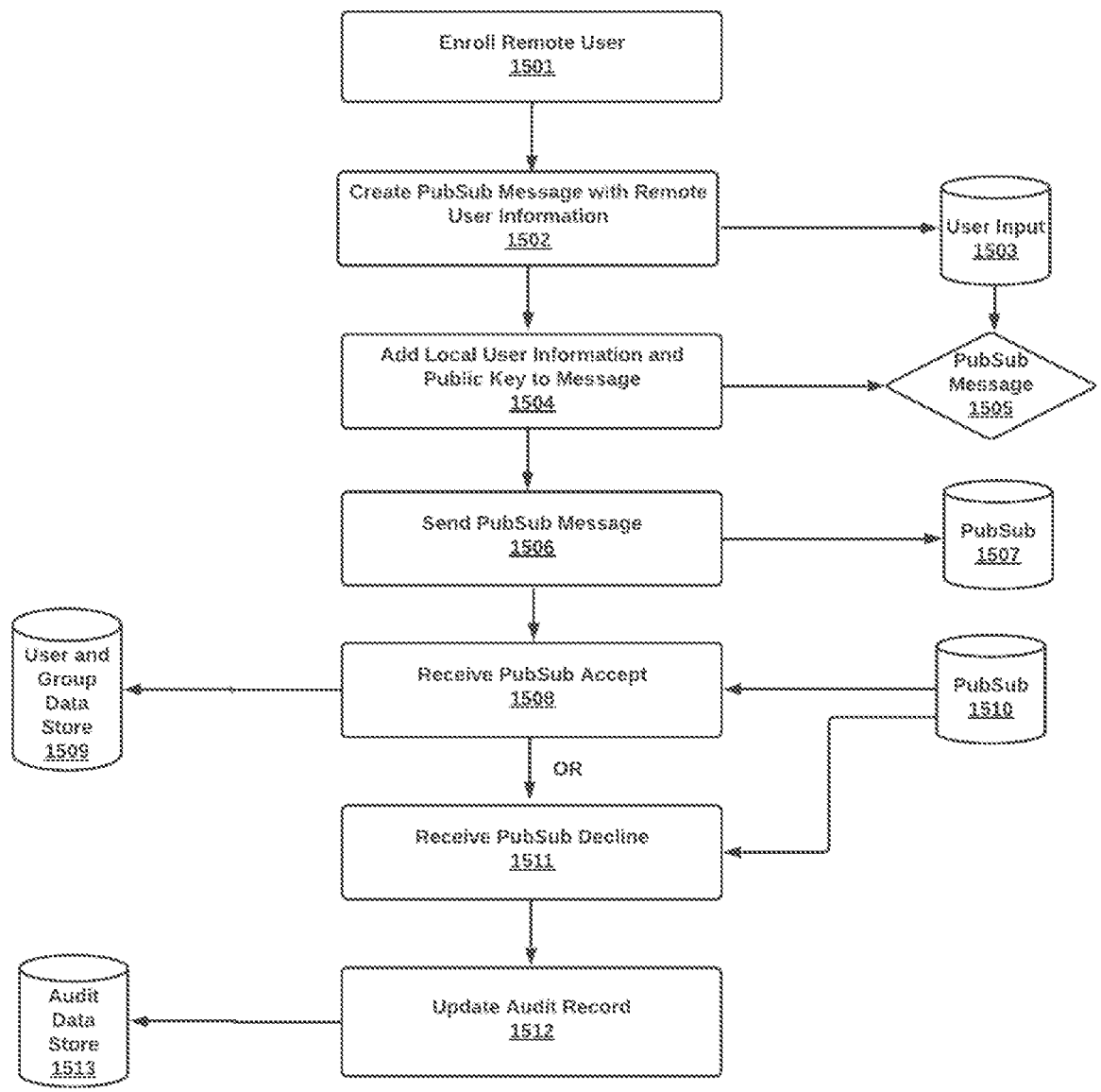
FIG. 15 is a flow diagram illustrating the process of enrolling a remote user using secure PubSub messages.

Referring now to FIG. 15 there is shown a system architecture of enrolling remote users to the local user data store 1501. The local user provides 1502 information about the remote user including one more of name, email address, phone number or other information 1503. In addition, the local user name, email address, node ID and public key is added 1504 to the PubSub message 1505. An enrollment PubSub message is created 1506 and broadcast to PubSub 1507. The recipient user receives the PubSub message, approves the enrollment, and returns a secure confirmation PubSub message 1510 (see FIGS. 22A-B) to the local user 1508. Alternatively, the remote user receives the PubSub message and declines the enrollment request and returns the decline message 1510 to the local user 1511. If the recipient user accepts the enrollment the local user data store is updated 1509 with the remote user information and identifying credentials. An event record is added 1512 to the audit data store 1513.

Other functions are contemplated. For example, the local user can suspend, re-activate or delete remote users from their local list. Deleted or suspended users are denied access to document encryption keys. Also, a non-enrolled person may be invited to install a software package that implements some or all of the functionality described herein.

User Groups

Figure 16:
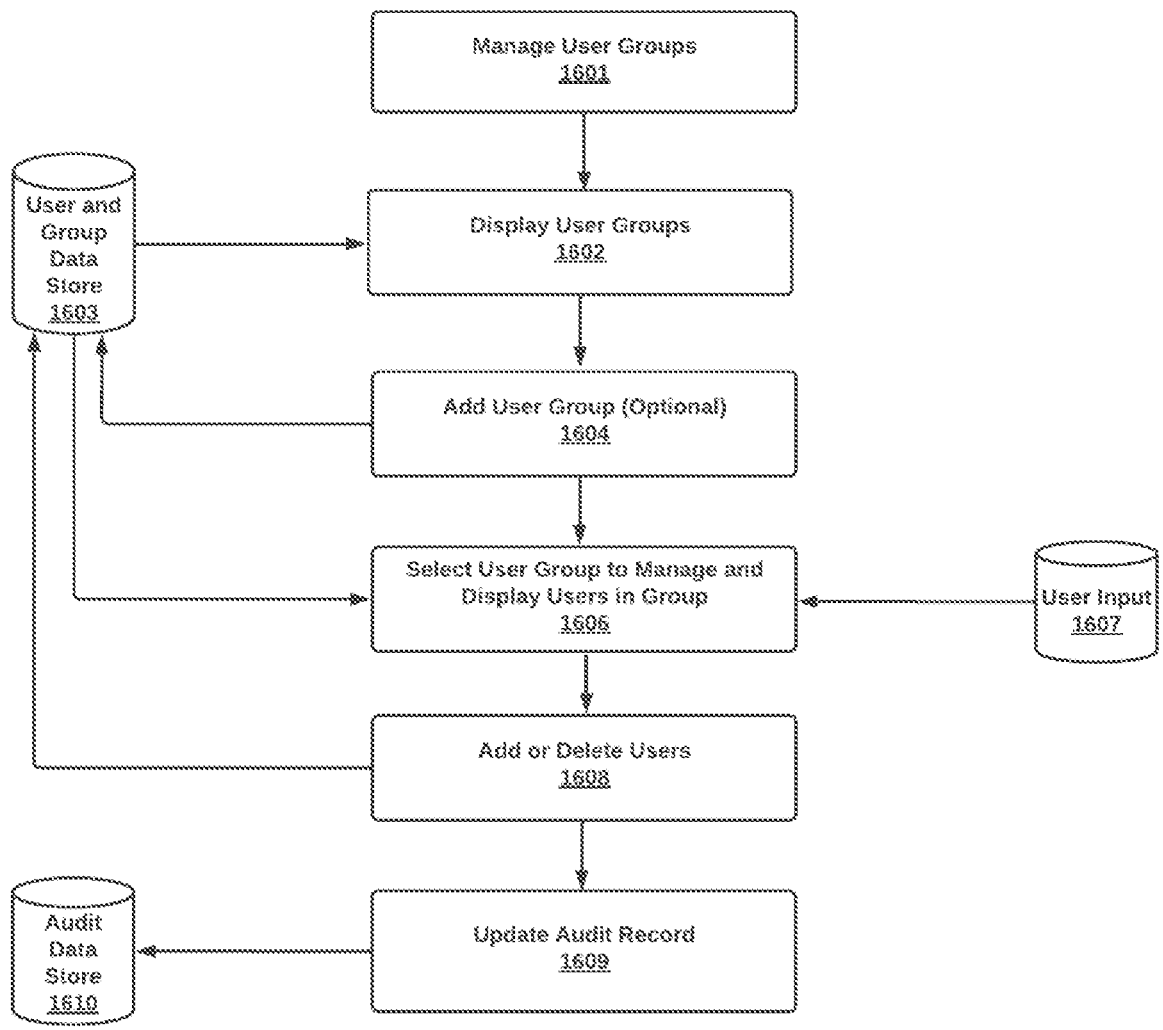
FIG. 16 is a flow diagram illustrating the process of creating and maintaining user groups.

Referring now to FIG. 16 there is shown a system architecture of managing named user groups 1601. A list of existing user groups 1603 is displayed 1602 to the local user. An option is provided 1604 to create a new group to add to the list 1603. The local user then selects 1603 one group to manage 1606 and the existing remote users 1603 (previously enrolled as discussed with respect to FIG. 15 and PubSub) in the group are displayed to the local user 1607. The local user can then add 1608 a new user to the group 1603, or alternatively can delete 1608 a user from the group. The group definition may also be shared with selected other users. In some embodiments, enrolled users can query the list of users in a group if so authorized by the group owner or other administrator. An event record is added 1609 to the audit data store 1610.

Document Backup and Archival Service

Figure 17:
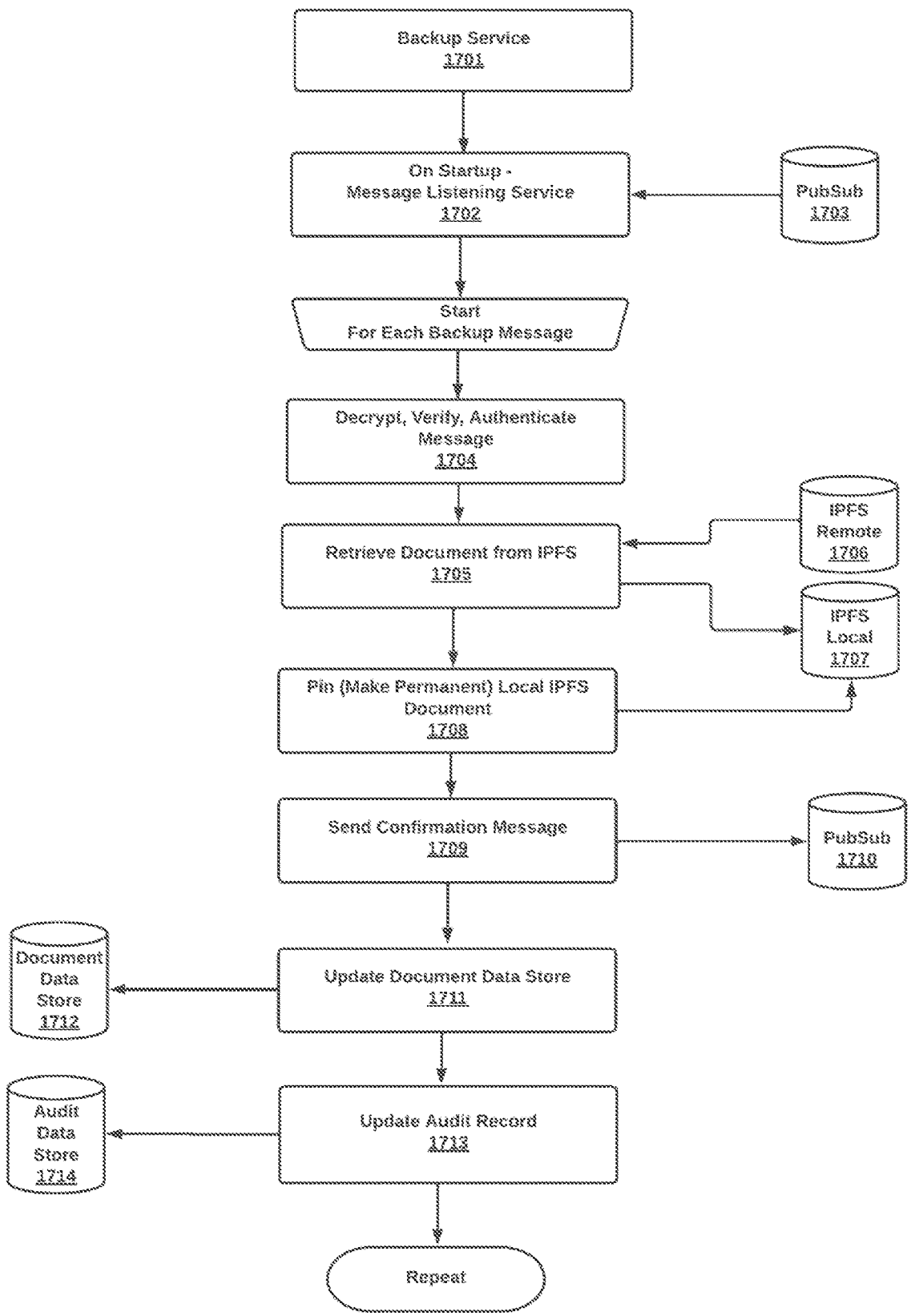
FIG. 17 is a system diagram of a remote backup service based on IPFS and PubSub messages.

Referring now to FIG. 17 there is shown a system architecture of providing a document backup service in part utilizing IPFS 1701. When the system is started a process 1702 listens on PubSub 1703 for a secure backup message. For each received message: the PubSub message is decrypted, verified and authenticated 1704 (see FIGS. 22A-B). The IPFS content identifier for the document is used 1705 to retrieve the document from the remote IPFS node 1706 to the local IPFS node 1707. The received document is then pinned (made permanent) 1708 in the local IPFS node 1707. A secure confirmation message is then created, encrypted 1709, and sent to the requesting user via PubSub 1710 (see FIGS. 22A-B). The local backup service data store 1712 is updated 1711 with the document information. An event record is added 1713 to the audit data store 1714. The process is repeated for each backup service message.

In some embodiments, a backup server automatically replicates all archived documents to one or more additional backup servers. The backup storage may be acquired through the FileCoin or similar service. In addition, a backup server may periodically create an audit list of all of the archived documents and send this to backup users via a secure PubSub message. The backup server may also request a document synchronization list from each user, and retrieve any un-archived documents automatically. The backup server may restrict service access based on geographical location.

Manage Directories for Synchronization

Figure 18:
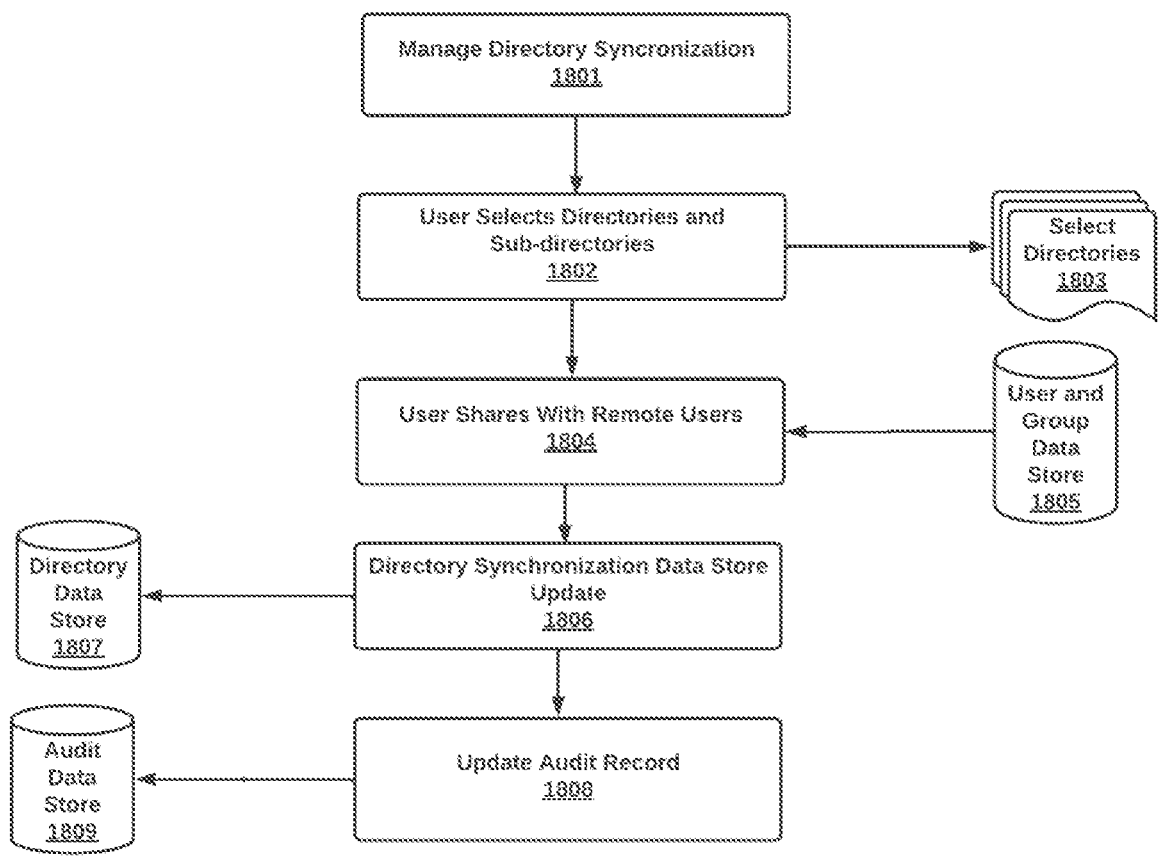
FIG. 18 is a flow diagram illustrating the process of managing local directories for synchronization with IPFS.

Referring now to FIG. 18 there is shown a system architecture of providing a method for the user to select directories or folders for secure, encrypted synchronization with IPFS 1801. A user selects 1802 one or more directories 1803 to be monitored through a user interface. The user interface allows for navigation to sub-directories 1803 for selection. A directory can also be removed from monitoring when the data store 1807 is updated. A selected directory can also be configured 1804 to automatically share documents with remote users 1805. When a directory is selected for monitoring the local directory data store 1807 is updated 1806. An event record is added 1808 to the audit data store 1809 for all directory actions performed by the user.

Directory Synchronization Process

Figure 19:
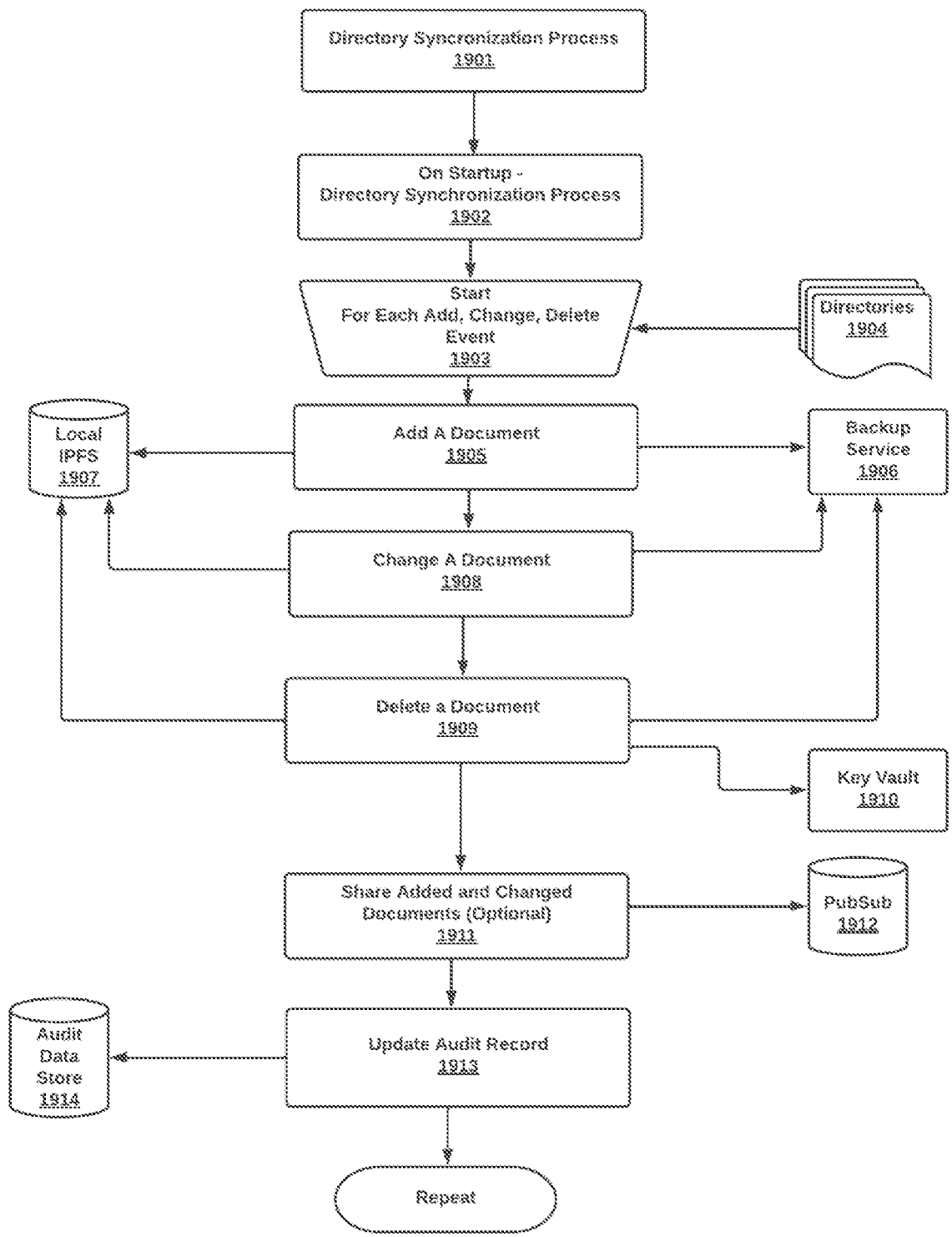
FIG. 19 is a flow diagram illustrating the process of synchronizing documents in local directories with IPFS.

Referring now to FIG. 19 there is shown a system architecture of starting a local background process 1902 to monitor 1903 one or more user-configured directories 1904. For each document add, change or delete event in the directory: for added 1905 or changed 1908 documents add the document to IPFS 1907, for deleted documents 1909 remove the document from IPFS 1907, for added 1905 or changed 1908 documents add the document to the backup service 1906, for deleted documents 1909 optionally remove the document from the backup service 1906, optionally update the key vault 1910 for permanently deleted documents, and optionally share 1911 new and changed documents with remote users using PubSub 1912. An audit record is added 1913 to the audit data store 1914 for all directory actions performed by the background process. Note that the directory synchronization process may synchronize IPFS with a backup service or other storage system, such as a local store, a cloud-based storage service (e.g., DropBox, Amazon S3, Google Cloud), a different IPFS system, or the like.

Alerts and Notifications

Figure 20:
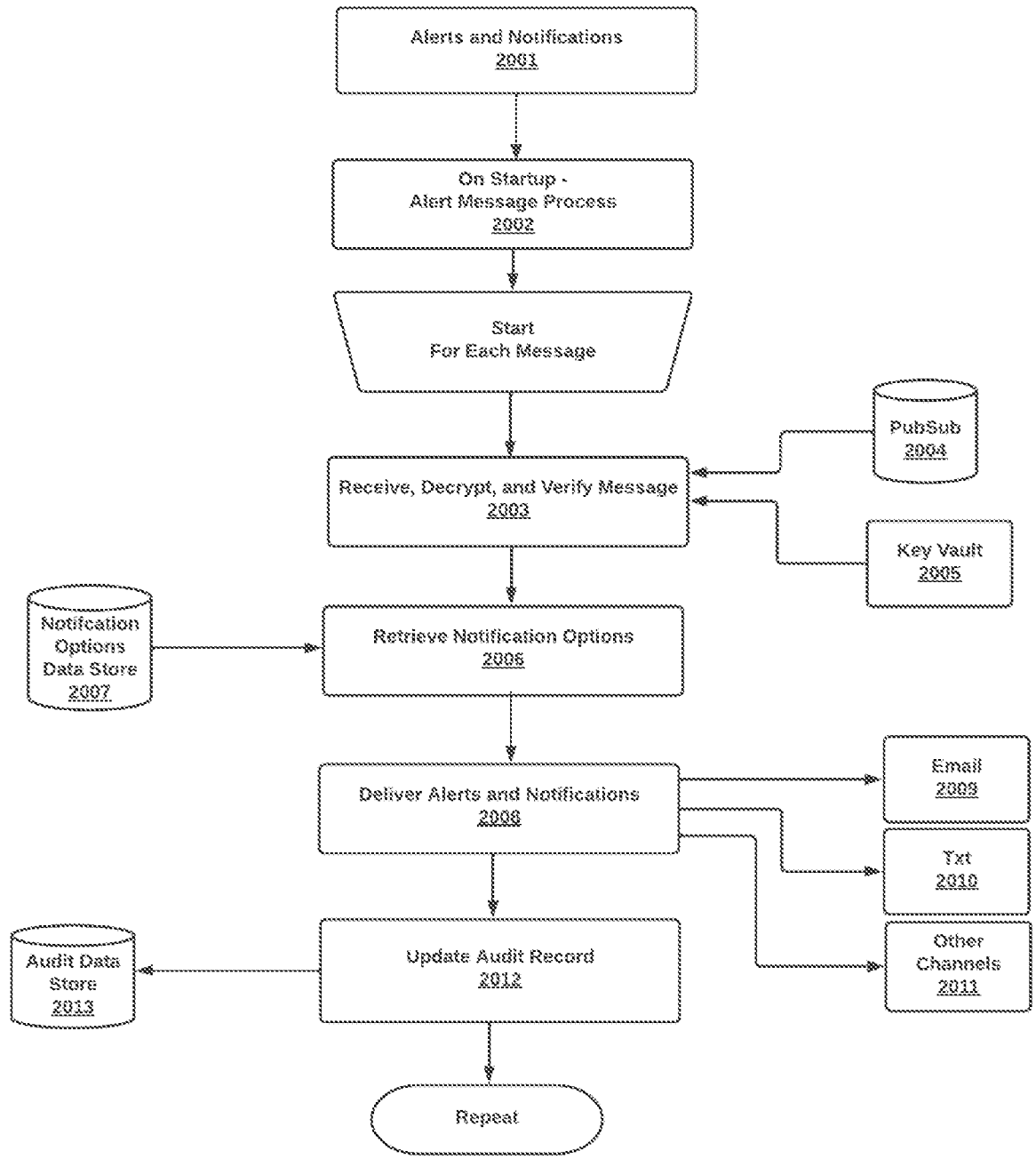
FIG. 20 is a flow diagram illustrating the process of sending alerts and notifications to a user using PubSub.

Referring now to FIG. 20 there is shown a system architecture of starting a local background process 2001, 2002 to monitor and process alerts and secure messages from PubSub. For each message: receive 2003 the message from PubSub and decrypt it (see FIGS. 22A-B), retrieve 2006 alert options and information from the configuration data store 2007, and deliver 2008 the message to the recipient through email 2009, text 2010, and other channels 2011. An audit record is added 2012 to the audit data store 2013 for all alert and notification actions.

Processing PubSub Messages

Figure 21:
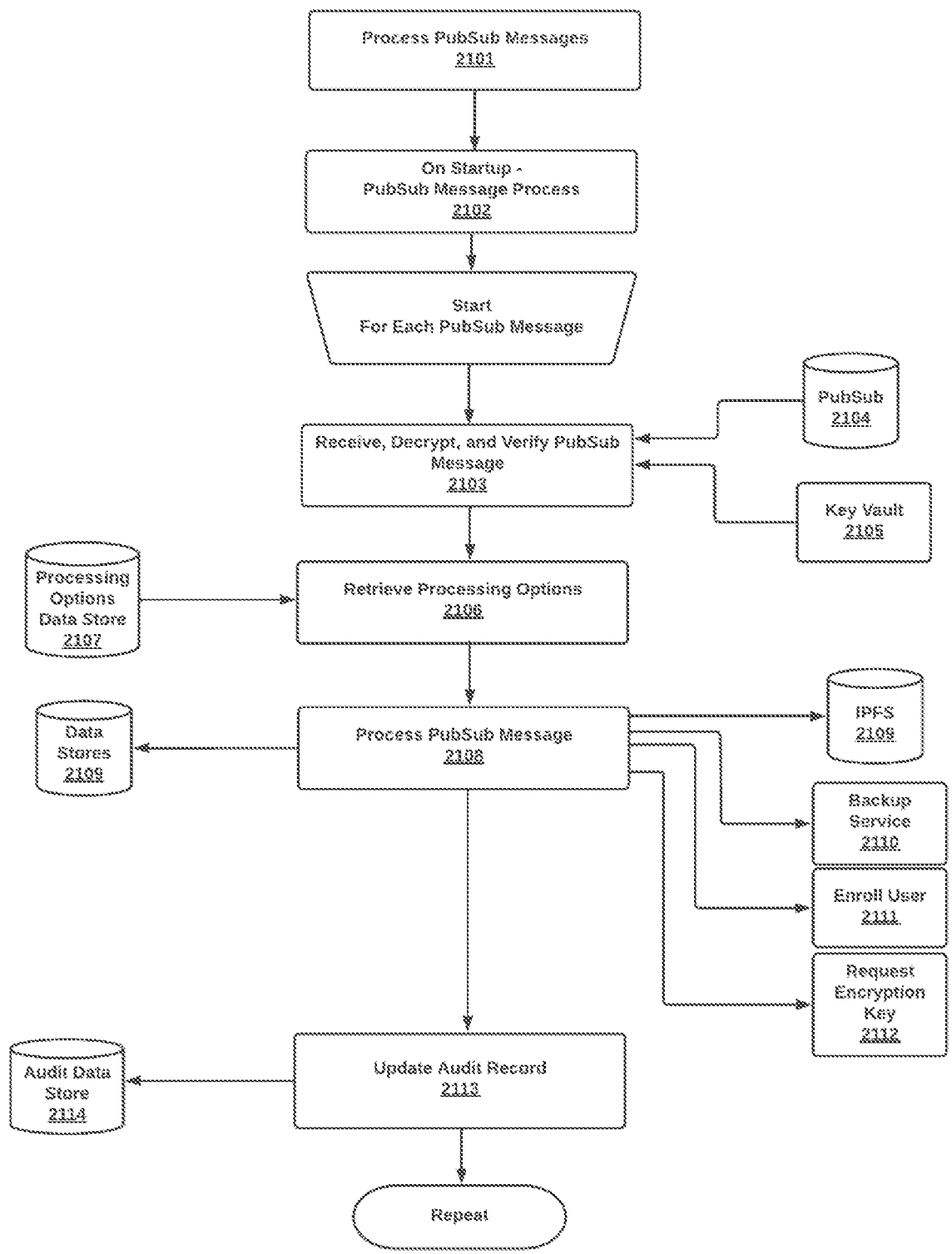
FIG. 21 is a flow diagram illustrating the process of receiving alerts and notifications and sending them to a user with use of PubSub.

Referring now to FIG. 21 there is shown a system architecture of starting a local background process 2101 to monitor and process 2102 PubSub messages 2103. For each message: receive 2103 the message from PubSub and decrypt it 2105 (see FIGS. 22A-B) retrieve 2106 message processing options from the message options data store 2107, and process the message 2108 based on the operation function code in the message. Operations include adding a new document to the local IPFS file system 2109, adding a document to the backup server 2110, enrolling a new user 2111, requesting an encryption key 2112, updating information in the data store 2109, and many other operations. An audit record is added 2113 to the audit data store 2114 for all alert and notification actions performed by the user.

Securing a PubSub Message

Figure 22A:
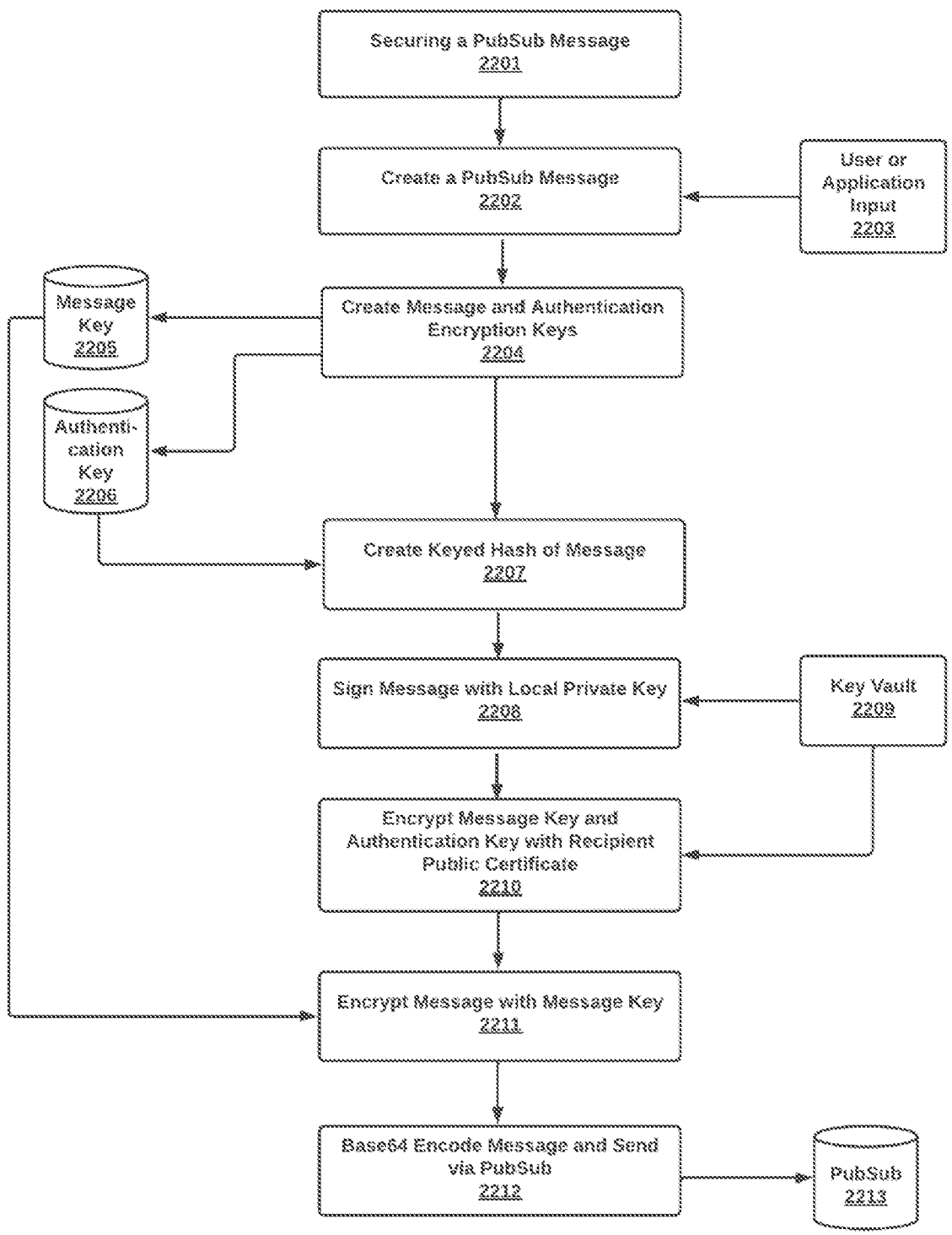
FIG. 22A is a flow diagram illustrating the process of securing a PubSub message with cryptography.

Referring now to FIG. 22A there is shown a system architecture and method of securing 2201 a PubSub message using cryptographic processes. A message is created 2202 by a user or application 2203. A symmetric message key and a symmetric authentication key 2205, 2206 are created 2204. A keyed hash of the message is created 2207 using the authentication key 2206. The keyed hash is signed 2208 by the user's local private key which is retrieved from the key vault 2209. The message key and authentication keys 2205, 2206 are encrypted with the recipient's public key which is retrieved from the key vault 2209. The message, keyed hash, signature, and other information are catenated or otherwise bundled to create the final message. This final message is encrypted 2211 with the message key 2205. The message is then Base64 encoded and sent 2212 to the recipient via PubSub 2213. The cryptography used to protect the message is in some embodiments based on quantum resistant methods. Note that other character encoding schemes may be employed, such as those using other bases (e.g., Base32 or Base85), uuencoding, BinHex, Bech32, or the like.

Figure 22B:
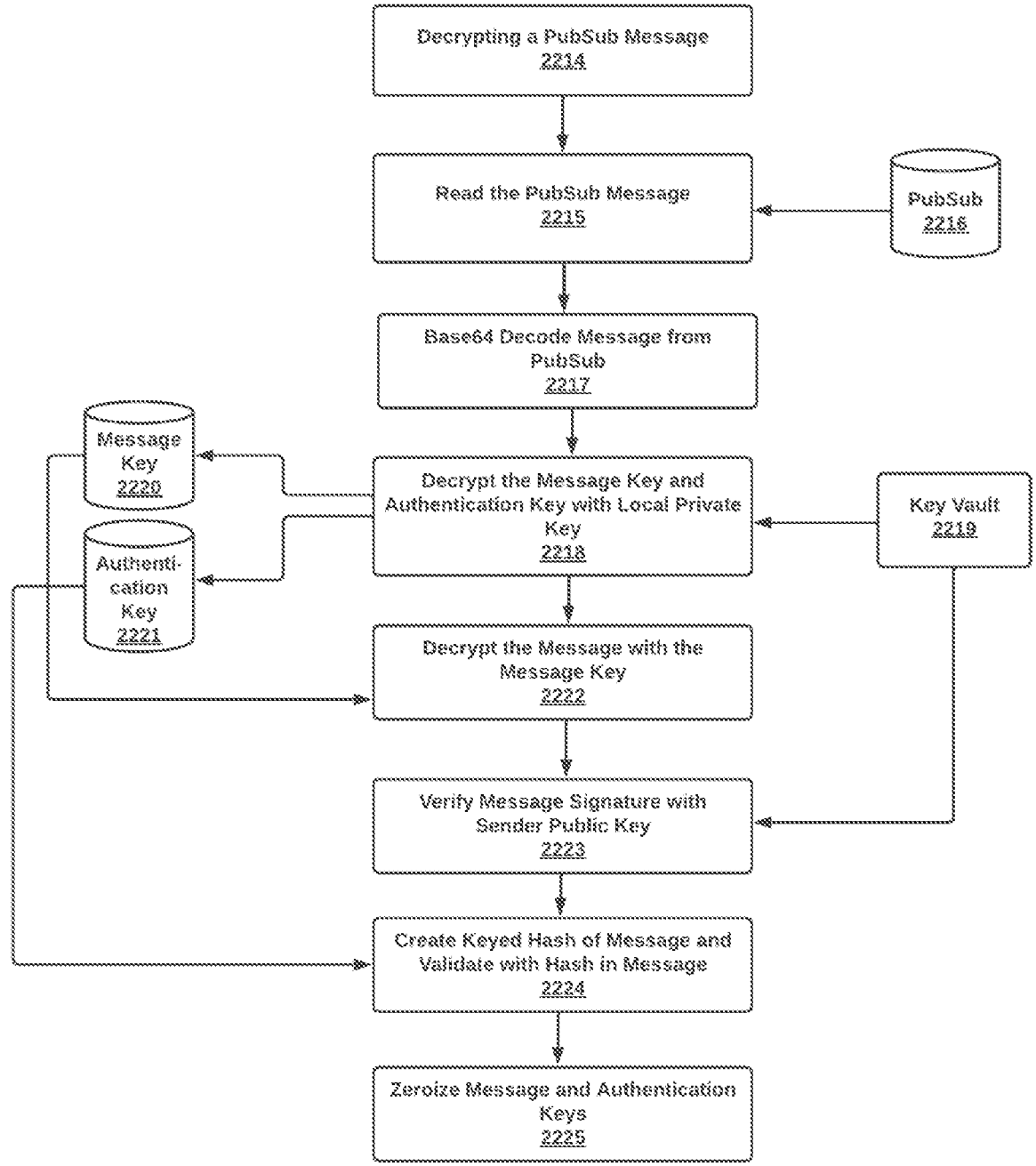
FIG. 22B is a flow diagram illustrating the process of decrypting and verifying a PubSub message with cryptography.

Referring now to FIG. 22B there is shown a system architecture and method of receiving and decrypting a PubSub message. On receipt of the PubSub message 2214 read the encrypted message 2215 from PubSub 2216. Then Base64 decode 2217 the message. Decrypt 2218 the message 2220 and authentication 2221 keys using the local private key retrieved from the key vault 2219. Decrypt the message 2222 with the message key 2220. Verify the message signature 2223 with the sender's public key retrieved from the key vault 2219. Create a keyed hash of the message 2224 using the authentication key 2221 and verify it against the keyed hash sent in the message. Zeroize the message and authentication keys 2225 and process the message.

Example Computing System Implementation

Figure 23:
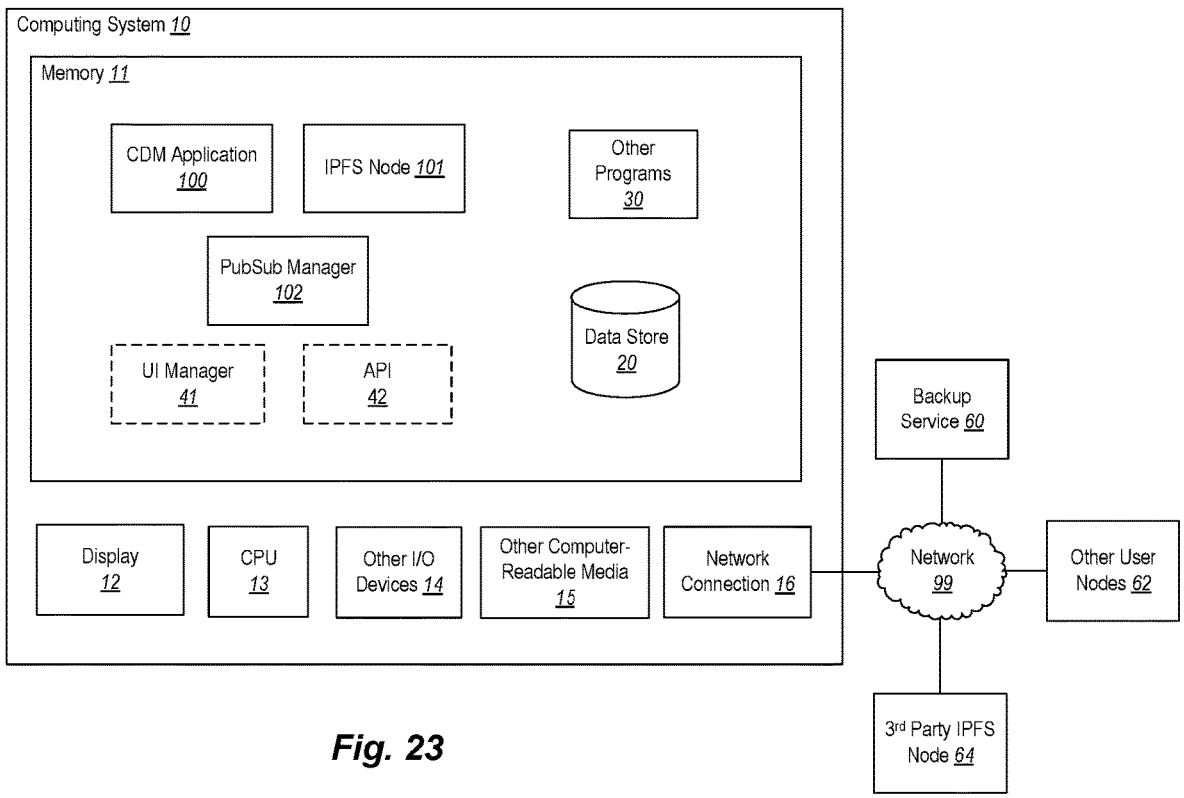
FIG. 23 is a block diagram of a user computing system configured according to example embodiments.

FIG. 23 is a block diagram of a user computing system configured according to example embodiments. In particular, FIG. 23 shows a computing system 10 that executes a collaboration application 100 to perform one or more of the functions described above. Similar techniques can be applied to implementing other computing systems such as backup service computing system 60 described above. Further, the described modules and/or processes may be implemented in software, hardware, firmware, or in some combination to achieve the capabilities described herein.

The computing system 10 may comprise one or more computing systems and may span distributed locations. In addition, each block shown may represent one or more such blocks as appropriate to a specific embodiment or may be combined with other blocks. Moreover, the various blocks may physically reside on one or more machines, which use standard remote procedure call (e.g., RPC) or proprietary inter-process communication mechanisms (IPC) to communicate with each other.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and a network connection 16. The CDM application module 100 is shown residing in memory 11. In other embodiments, some portion of the contents, some or all of the components of the module 100 may be stored on and/or transmitted over the other computer-readable media 15. Other modules may also be present in memory 11, such as an IPFS node 101, and/or a PubSub manager 102. The application 100 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 23 may not be present in any specific implementation. For example, some embodiments may not provide other computer readable media 15 or a display 12.

The CDM application 100, IPFS node 101, and PubSub manager 102 are shown executing in the memory 11 of the device 10. Also included in the memory 11 are a user interface manager 41 and an application program interface ("API") 42. The user interface manager 41 and the API 42 are drawn in dashed lines to indicate that in other embodiments, these modules may not be present and/or their functions may be performed externally to the system 10.

The UI manager 41 provides a view and a controller that facilitate user interaction with the application 100. For example, the UI manager 41 may provide interactive access (e.g., via a command line or graphically/visually) to the application 100, such that users or administrators can interact with the application 100 such as to create, view, modify, delete, or share documents. In some embodiments, access to the functionality of the UI manager 41 may be provided via a Web server, possibly executing as one of the other programs 30. In such embodiments, a user operating a Web browser executing on a client system or device can interact with the application 100 via the UI manager 41.

The API 42 provides programmatic access to one or more functions of the application 100. For example, the API 42 may provide a programmatic interface to one or more functions of the application 100 that may be invoked by one of the other programs 30 or some other module. In this manner, the API 42 facilitates the development of third-party software, such as user interfaces, plug-ins, adapters (e.g., for integrating functions of the application 100 into Web applications), and the like.

The application 100 may interact using network connection 16 via a network 99 with other devices/systems including the backup service computing system 60, other CDM user systems 62, and third-party IPFS nodes/systems 64. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. Computing systems 60, 62, and 64 may be constituted similarly to system 10.

Note that one or more general purpose or special purpose computing systems/devices may be used to implement and/or execute the application 100. However, just because it is possible to implement the application 100 on a general-purpose computing system does not mean that the techniques themselves or the operations (taken alone or in combination) required to implement the techniques are conventional or well known. The techniques are not conventional at least because they address and improve an existing technology, such as by improving the operation, integration, security, or efficiency of one or more computing systems.

In an example embodiment, components/modules of the application 100 are implemented using software programming techniques. For example, the application 100 may be implemented as a "native" executable running on the CPU 13, along with one or more static or dynamic libraries. In other embodiments, the application 100 may be implemented as instructions processed by a virtual machine that executes as one of the other programs 30.

The various components may be implemented using more monolithic programming techniques, for example, as an executable running on a single CPU computer system, or alternatively decomposed using a variety of structuring techniques, including but not limited to, multiprogramming, multithreading, client-server, microservices, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the application 100, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Furthermore, in some embodiments, some or all of the components of the application 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A team collaboration and document management system, comprising:
   multiple user computing systems that each host a local node of an Interplanetary File System (IPFS) and that are configured to:
   encrypt a first document using a block cipher with a unique encryption key;
   add a version record to a document data store;
   save the encrypted first document to the IPFS file system;
   save a unique content identifier provided by the IPFS file system for the first document to a local data store; and
   send a secure backup message to a backup service with the unique content identifier using PubSub; and
   a backup service computing system that hosts a local node of the IPFS file system and that is configured to:
   receive via PubSub a secure backup message from at least one of the multiple user computing systems;
   request, using the unique content identifier in the backup message, a copy of the identified document for storage by an IPFS node of the backup service;
   upon receiving the identified document, pin the document to the backup service IPFS node to make the document permanent; and
   transmit to a sender of the backup message a secure PubSub message to confirm the backup.

2. The team collaboration and document management system of claim 1, wherein each of the multiple user computing systems is configured to share documents with one or more users and/or groups, by:
   creating a document sharing message containing an IPFS content identifier of a shared document;
   for each recipient that is one of the one or more users and/or groups:
   encrypting the document sharing message with a public key of the recipient; and
   sending to the recipient the encrypted file sharing message using PubSub, thereby causing a computing system of the recipient to:
   obtain from the IPFS a copy of the shared document;
   store the shared document on a local IPFS node hosted by the computing system of the recipient; and
   pin the stored document to the local IPFS node hosted by the recipient computing system.

3. A method for document management by a computing system that hosts a local IPFS node, comprising:
   adding documents to an IPFS file system by:
   creating a unique encryption key;
   encrypting a document using a block cipher with the unique encryption key;
   adding a version record to a document data store;
   saving the encrypted document to the IPFS file system;
   saving a unique content identifier provided by the IPFS file system for the document to a local data store;
   sending a message to a backup service with the unique content identifier using PubSub; and
   updating the local data store with document information; and
   deleting documents from the IPFS file system by for each document of the documents to be deleted:
   receiving a document name and content identifier of the document;
   verifying, based on the content identifier, the document in the IPFS file system;
   deleting the document from the IPFS file system;
   unpinning the document in the local IPFS node;
   removing hashtag, version, audit, and descriptive text from the local data store; and
   updating a local audit data store.

4. The method of claim 3, further comprising:
   collecting one or more hashtag values from a user;
   collecting descriptive text about the first document from the user; and
   saving the hashtag and descriptive text to the local data store.

5. The method of claim 4, wherein the hashtag values and the descriptive text are saved to the local data store along with the unique content identifier of the first document.

6. The method of claim 4, wherein the block cipher is an Advanced Encryption Standard (AES) cipher in Galois/Counter Mode (GCM).

7. The method of claim 3, further comprising updating a document by:
receiving an indication of a second document that is an updated version of the first document;
saving the second document in the IPFS file system; and
adding a version record to the local data store, wherein the version record indicates that the second document is an updated version of the first document.

8. The method of claim 3, wherein the step of deleting documents from the IPFS file system further comprises: sending a secure PubSub message to all shared users, the secure PubSub message causing deletion of remote copies of the document.

9. The method of claim 3, wherein the step of deleting documents from the IPFS file system further comprises: deleting an encryption key for the document from a key vault.

10. The method of claim 3, wherein the step of deleting documents from the IPFS file system further comprises:
sending a secure message using PubSub to the backup service with the content identifier of the document, the secure PubSub message causing deletion of a backup copy of the document stored by the backup service; and
receiving from the backup service an acknowledgement of the file deletion.

11. The method of claim 3, wherein the document is deleted from the local IPFS node but is retained on any backup servers.

12. The method of claim 3, further comprising reading a secured document from the IPFS file system by:
selecting a document to read;
if the selected document is owned by a user, retrieving an encryption key from a key vault, otherwise requesting the encryption key from an owner of the selected document using secure PubSub messaging;
decrypting and verifying the selected document;
presenting the selected document to the user;
securely erasing the encryption key from volatile memory; and
updating a local audit data store.

13. The method of claim 12, wherein presenting the selected document includes displaying the selected document to the user or launching an application to view or process the selected document.

14. The method of claim 3, further comprising searching for documents in the IPFS file system by:
receiving search criteria including document name or partial name;
creating a combination of one or more of: a date or date range, a last update date or date range, one or more hashtags, descriptive text, one or more keywords, document importance, document owner, document content values, shared username, and shared group name;
displaying predictive text suggestions during user input;
displaying dynamic search results during and after user input;
displaying the result of the document search with options to take actions on the searched documents;
providing an option to save the search criteria and results for future use; and
writing an audit record to the local data store.

15. A method for document management by a computing system that hosts a local IPFS node, comprising:
adding documents to an IPFS file system by:
creating a unique encryption key;
encrypting a document using a block cipher with the unique encryption key;
adding a version record to a document data store;
saving the encrypted document to the IPFS file system;
saving a unique content identifier provided by the IPFS file system for the document to a local data store;
sending a message to a backup service with the unique content identifier using PubSub; and
updating the local data store with document information; and
sharing documents with users or groups by:
receiving an indication of one or more users and/or groups;
creating a document sharing message containing an IPFS content identifier of a shared document;
for each recipient that is one of the indicated one or more users and/or groups;
encrypting the document sharing message with a public key of the recipient; and
sending to the recipient the encrypted file sharing message using PubSub; and
recording document sharing information in a local data store.

16. The method of claim 15, further comprising sharing the document hashtags and descriptive text with one or more users and/or groups.

17. The method of claim 15, wherein the encrypted file sharing message causes a recipient computing system to:
obtain from the IPFS a copy of the shared document;
store the shared document on a local IPFS node hosted by the recipient computing system; and
pin the stored document.

18. A method for document management by a computing system that hosts a local IPFS node, comprising:
adding documents to an IPFS file system by:
creating a unique encryption key;
encrypting a document using a block cipher with the unique encryption key;
adding a version record to a document data store;
saving the encrypted document to the IPFS file system;
saving a unique content identifier provided by the IPFS file system for the document to a local data store;
sending a message to a backup service with the unique content identifier using PubSub; and
updating the local data store with document information; and
backing up each document of the documents to the backup service by:
receiving an indication of the document;
verifying that the document exists on the local IPFS node;
creating a backup message that is a secure PubSub message including a document name and IPFS content identifier;
sending the backup message to the backup service via PubSub;
receiving confirmation via PubSub that the document has been backed up, or that the document had been previously backed up;
updating the local data store with the backup message; and
writing an audit record to the local data store.

19. The method of claim 18 wherein storage for the backup service is provided by a distributed storage system.

20. A method for document management by a computing system that hosts a local IPFS node, comprising:
adding documents to an IPFS file system by:
creating a unique encryption key;
encrypting a document using a block cipher with the unique encryption key;
adding a version record to a document data store;
saving the encrypted document to the IPFS file system;
saving a unique content identifier provided by the IPFS file system for the document to a local data store;
sending a message to a backup service with the unique content identifier using PubSub; and
updating the local data store with document information; and
restoring a document from the backup service using IPFS by:
receiving an indication of the document to be restored from the backup service;
retrieving a unique IPFS content identifier of the document to be restored from the local data store;
verifying that the document to be restored does not already exist on the local IPFS node;
issuing to the backup service an IPFS document retrieval request using the content identifier;
pinning the document to be restored to the local IPFS node;
updating the local data store with information from the backup service; and
writing an audit record to the local data store.

21. The method of claim 20 wherein the restored document is an original document of the restored document.

22. A method for document management by a computing system that hosts a local IPFS node, comprising:
adding documents to an IPFS file system by:
creating a unique encryption key;
encrypting a document using a block cipher with the unique encryption key;
adding a version record to a document data store;
saving the encrypted document to the IPFS file system;
saving a unique content identifier provided by the IPFS file system for the document to a local data store;
sending a message to a backup service with the unique content identifier using PubSub; and
updating the local data store with document information; and
inviting and enrolling a remote user by a local user, by:
collecting remote user information including name, email address, and remote user node identifier;
creating an invitation message that includes the remote user identifying information and local user identifying information, local IPFS node identifier, and local user public key;
sending the invitation message via PubSub;
receiving via PubSub an acceptance or rejection of the invitation;
if the invitation is accepted, adding a remote user public key to a key vault and adding the remote user information and the remote user public key to the local data store; and
writing audit information to the local data store.

* * * * *